US008267770B2

(12) United States Patent
Mizue

(10) Patent No.: US 8,267,770 B2
(45) Date of Patent: Sep. 18, 2012

(54) CONTROLLER FOR INITIATING FUNCTION ASSOCIATED WITH SYMBOL COUNTER USED IN GAMING MACHINE

(75) Inventor: Hayato Mizue, Kanagawa (JP)

(73) Assignee: Konami Gaming, Inc., Las Vegas, NV (US)

( * ) Notice: Subject to any disclaimer, the term of this patent is extended or adjusted under 35 U.S.C. 154(b) by 465 days.

(21) Appl. No.: 12/384,130

(22) Filed: Mar. 31, 2009

(65) Prior Publication Data

US 2010/0248807 A1 Sep. 30, 2010

(51) Int. Cl.
*A63F 9/24* (2006.01)
*A63F 13/00* (2006.01)

(52) U.S. Cl. .......... 463/20

(58) Field of Classification Search .......... 463/20
See application file for complete search history.

(56) References Cited

U.S. PATENT DOCUMENTS

| | | | | |
|---|---|---|---|---|
| 6,439,993 | B1 | 8/2002 | O'Halloran | |
| 6,916,243 | B2 | 7/2005 | Yoshida | |
| 7,070,502 | B1 | 7/2006 | Bussick et al. | |
| 7,179,166 | B1 * | 2/2007 | Abbott | 463/9 |
| 7,311,607 | B2 * | 12/2007 | Tedsen et al. | 463/32 |
| 7,704,137 | B2 * | 4/2010 | Englman | 463/16 |
| 8,070,589 | B2 * | 12/2011 | Macke | 463/20 |
| 2004/0033828 | A1 * | 2/2004 | Gagner | 463/20 |
| 2004/0072606 | A1 | 4/2004 | Majima et al. | |
| 2004/0259622 | A1 * | 12/2004 | Duhamel | 463/16 |
| 2006/0040721 | A1 | 2/2006 | Cuddy et al. | |
| 2006/0142077 | A1 * | 6/2006 | Miles et al. | 463/20 |
| 2008/0108425 | A1 * | 5/2008 | Oberberger | 463/25 |
| 2008/0254893 | A1 * | 10/2008 | Patel et al. | 463/42 |
| 2009/0291728 | A1 * | 11/2009 | Ungaro et al. | 463/13 |
| 2010/0173690 | A1 * | 7/2010 | Jackson | 463/16 |
| 2011/0105215 | A1 * | 5/2011 | Mizue | 463/20 |

FOREIGN PATENT DOCUMENTS

| | | | |
|---|---|---|---|
| EP | 1 624 421 | A2 | 2/2006 |
| JP | 2002-360776 | A | 12/2002 |
| JP | 2004-160195 | A | 6/2004 |
| JP | 2008-049122 | | 3/2008 |
| JP | 2008-514300 | A | 5/2008 |
| JP | 2009-017975 | | 1/2009 |
| JP | 2009-017979 | | 1/2009 |
| WO | 2006036948 | A2 | 4/2006 |

OTHER PUBLICATIONS

Phantom EFX, 1st Slot Club Relase, Green Thumb, Windows DVD-ROM, 2007.*

Notice of Rejection issued in JP Patent Application No. 2010-052892, issued on Apr. 3, 2012, issued from Japan Patent Office.

* cited by examiner

*Primary Examiner* — William D Coleman
(74) *Attorney, Agent, or Firm* — Masuvalley & Partners

(57) ABSTRACT

The present invention is a gaming machine that realizes an exciting game in a video slot format. The gaming machine includes a display and a controller. The display shows reels and gauges. The reel comprises symbols. The gauges are provided so that each of them corresponds to at least one of the reels. The controller controls the movement of the symbols. One of the symbols is a specific type of symbol. The controller counts the number of how many times the specific type of symbol appears in the display reel by reel and reflects the counted numbers in the gauges. When the counted number reaches a threshold, the controller is arranged to initiate a feature on the reel whose gauge's value reaches the threshold.

19 Claims, 26 Drawing Sheets

CONTROLLER FOR INITIATING FUNCTION ASSOCIATED WITH SYMBOL COUNTER USED IN GAMING MACHINE

TECHNICAL FIELD

The present invention relates to gaming machines such as slot machines, video slot machines and so on that are popularly played in casinos, pachisuro parlors and other locations.

BACKGROUND OF THE INVENTION

Video slots are popular gaming machines in casinos and attract many players. While slot machines have mechanical reels, video slots show imaginary reels in their displays. In a typical video slot, symbol images are aligned in columns and rows on its display. Once the player bets a credit, the symbols moves from top to bottom as if reels are rotating in the display. Then, symbols stop after a while. When the same type of symbols are aligned in a line, the player can get back the bet credit sometimes multiplied by dozens or even hundreds of times. Such occasional big wins make the video slots exciting.

The advantage of the video slots is that since all the important components necessary for the games are generated as images on the display, they can provide more diverse game rules than slot machines. In addition, more stimulating visual effects and animations are easy to produce. Such features enable the video slots to have very entertaining games. Although hundreds of thousands of video slots have been manufactured so far, the video slots still have a big potential to be more exciting and entertaining, utilizing software technologies.

SUMMARY OF THE INVENTION

The present invention of the gaming machine includes a display and a controller. The display shows reels and gauges. The reel includes symbols. The gauges are provided so that each of them corresponds to at least one of the reels. The controller controls the movement of the symbols. One of the symbols is a ‘specific type of symbol’. When the ‘specific type of symbol’ appears in the display, the controller adds a certain value to the gauge corresponding to the reel where the ‘specific type of symbol’ appears. In other words, the controller counts the numbers of how many times the ‘specific type of symbol’ appears in the display reel by reel and reflects the counted numbers to the gauges. When the counted number reaches a threshold, the controller is arranged to initiate a ‘feature’ on the reel whose gauge’s value reaches the threshold. This arrangement of the gaming machine results in an exciting game.

Examples of the ‘specific type of symbol’ are a wild symbol and bonus symbol. The ‘feature’ is an event that brings a benefit to the player such as an event that increases a winning chance on the reel whose gauge’s value has reached the threshold. Such an event is realized for example by changing the ‘specific type of symbol’ into another type of symbol that brings a benefit to the player. Examples of the ‘feature’ are an appearance of an ‘entire reel wild symbol’ or a payout of a bonus credit to the player. The ‘entire reel wild symbol’ functions as a wild symbol in all rows in the reel.

One preferable arrangement of the gaming machine is that the total number of the gauges is the same as the total number of the reels. This arrangement makes the game more fun. In addition, this arrangement easily gives the beauty of unity brought by the reels and gauges.

The other preferable arrangement of the gaming machine is that the threshold is lowered when the controller receives an input of an extra bet. This gives a benefit to the player who pays more.

The other preferable arrangement of the gaming machine is that the total number of gauges is smaller than the total number of reels. This allows the game designer to easily design a good balanced game.

The other preferable arrangement of the gaming machine is that the gaming machine includes plural gauges for one reel and plural kinds of the ‘specific types of symbols’. And, each of the ‘specific types of symbols’ corresponds to each of the gauges provided for one reel. This arrangement gives diverse joy to the player.

The other preferable arrangement of the gaming machine is that one gauge corresponds to plural reels. And the gauge is arranged to reflect a total counting number over the corresponding reels. This arrangement gives a chance to initiate the feature in plural reels at the same time, providing the player an opportunity to obtain a very high reward.

The other preferable arrangement of the gaming machine is that the controller shows an availability to initiate the feature on the reel whose gauge’s value reaches the threshold. Then, the controller initiates the feature when the controller receives an instruction to initiate the feature from the player. This arrangement makes the game more tactical.

DETAILED DESCRIPTION OF INVENTION

Below, the present invention of the gaming machine is described in detail based on specific examples in the following order:

§1. Architecture of the gaming machine 1
§2. Example 1
§2.1. Design of Example 1
§2.2. Operation of Example 1
§3. Example 2
§3.1. Design of Example 2
§3.2. Operation of Example 2
§4. Example 3
§4.1. Design of Example 3
§4.2. Operation of Example 3
§5. Example 4
§6. Example 5
§6.1. Design of Example 5
§6.2. Operation of Example 5
§7. Example 6
§8. Example 7
§8.1. Design of Example 7
§8.2. Operation of Example 7
§9. Miscellaneous Remarks

§1. Architecture Of The Gaming Machine 1

Figure 1:
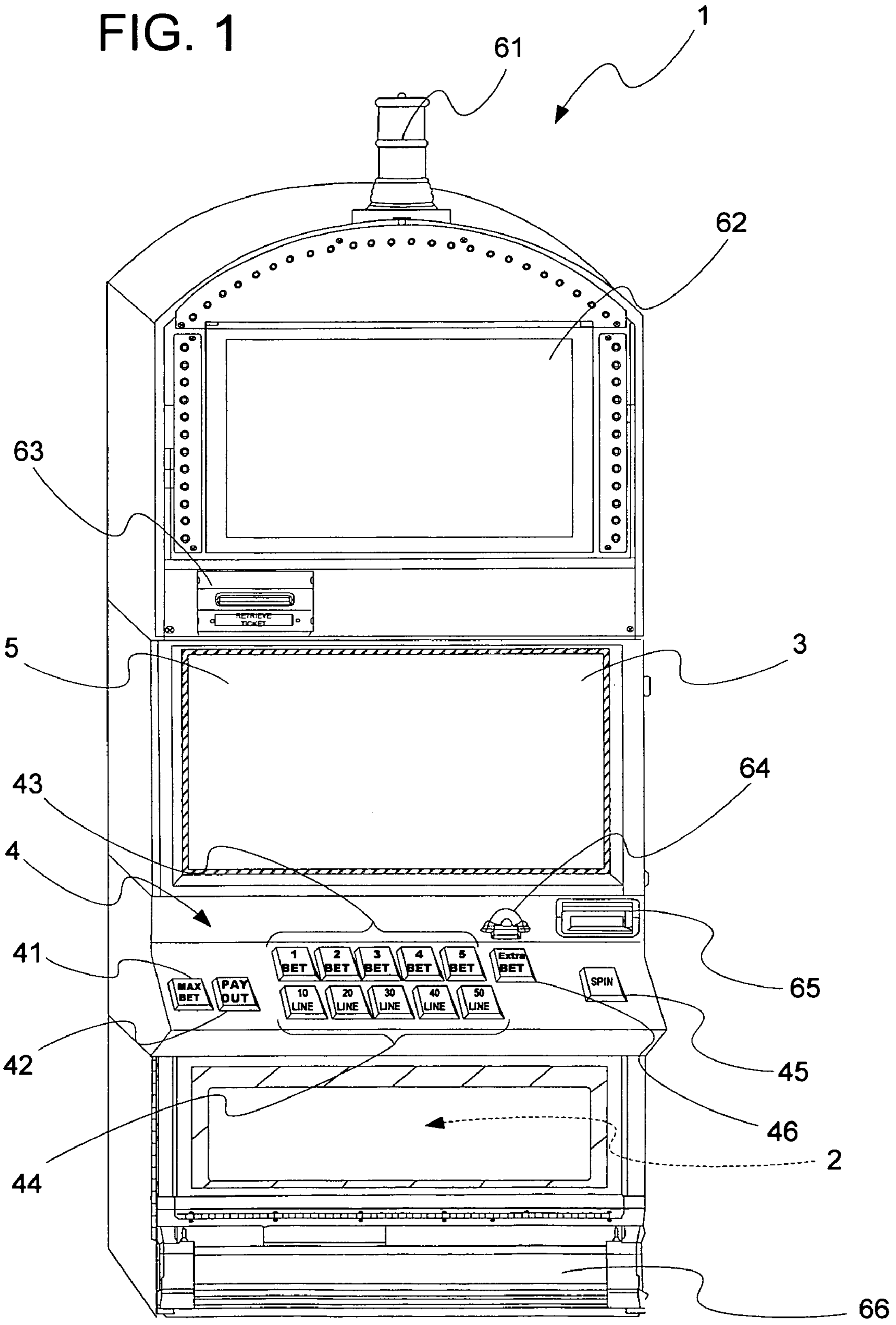
FIG. 1 is a perspective view illustrating an example of a gaming machine of the present invention.

FIG. 1 is a perspective view illustrating an example of a gaming machine of the present invention. The Gaming machine 1 is a so called video slot, in which symbols are shown in columns and rows as an image on its display. Once a player bets a credit and instructs to spin imaginary reels, the symbols move from top to bottom in the display and stop after a while. When same type of symbols align in a same line, the player can get back the credit as a reward. Since the gaming machine 1 has unique and fun features as described later, it is so exciting as to attract many players.

As shown in FIG. 1, the gaming machine 1 has an emergency lamp 61, an advertisement board 62, a card slot 63, a display 3, a touch panel 5, a coin slot 64, a bill acceptor 65, buttons 4 and a payout tray 66. The gaming machine 1 also has a controller 2 internally.

On the top of the gaming machine 1 stands the emergency lamp 61. It is arranged to light on when a trouble happens somewhere on or in the gaming machine 1. The advertisement board 62 is located on the upper part of the gaming machine 1. It shows catchy illustrations and messages that attract potential players. The card slot 63 is provided below the advertisement board 62. It accepts a player's card which records information about the player. The card slot 63 also reads and writes the player's information on the player's card.

Below the card slot 63 lies the display 3. This shows images that make up the game like FIG. 3. The players are supposed to play games on the gaming machine 1, watching images and messages on the display 3. On the display 3, the touch panel 5 is overlayed. It sometimes receives a player's choice and instruction before, during or after the game when the player touches a specific area of the touch panel 5.

Below the display 3, the coin slot 64 and the bill acceptor 65 are provided. The player can insert coins into the coin slot 64 and bills or a credit card into the bill acceptor 65. Once the slot machine 1 accepts the money, the amount of money is converted to an amount of credit. With this credit, the gaming machine 1 provides fun slot games to the player.

The buttons 4 are also provided below the display 3. The buttons 4 are constituted with a MAX BET button 41, a PAYOUT button 42, BET buttons 43, LINE buttons 44, a SPIN button 45 and an Extra BET button 46. The BET buttons 43 are arranged from a 1 BET button to a 5 BET button from left to right. The numbers written on the BET buttons 43 correspond to the bet amounts for one line. For example, the player can bet one credit per line by pushing the 1 BET button, two credits per line by pushing the 2 BET button and three credits per line by pushing the 3 BET button. The MAX BET button 41 allows the player to bet the maximum amount of credit that is permitted in the game. In a specific situation in the game, the gaming machine 1 allows the player to push the Extra BET button 46. This activates some features in the game other than betting credits to lines. Parallel to the BET buttons 43, the LINE buttons 44 are arranged. The LINE buttons 44 are arranged from a 10 LINE button to a 50 LINE button from left to right. The numbers written on the LINE buttons 44 correspond to the number of winning lines the gaming machine 1 activates. For example, the player pushes the 10 LINE button when he/she wants to activate 10 winning lines for the game and the player pushes the 50 LINE button when he/she wants to activate 50 winning lines. The SPIN button 45 is provided to initiate the game after the player selects the bet amount and winning lines. Once the player presses the SPIN button 45, the symbols in the display start to spin. The PAYOUT button 42 is provided to return money to the player based on the amount of credit remained in the gaming machine 1. When the player finishes the game and wants to leave the gaming machine 1, the player pushes the PAYOUT button 42. Then, a certain amount of money or a money order is paid out from the payout tray 66, which is located near the bottom of the gaming machine 1.

Figure 2:
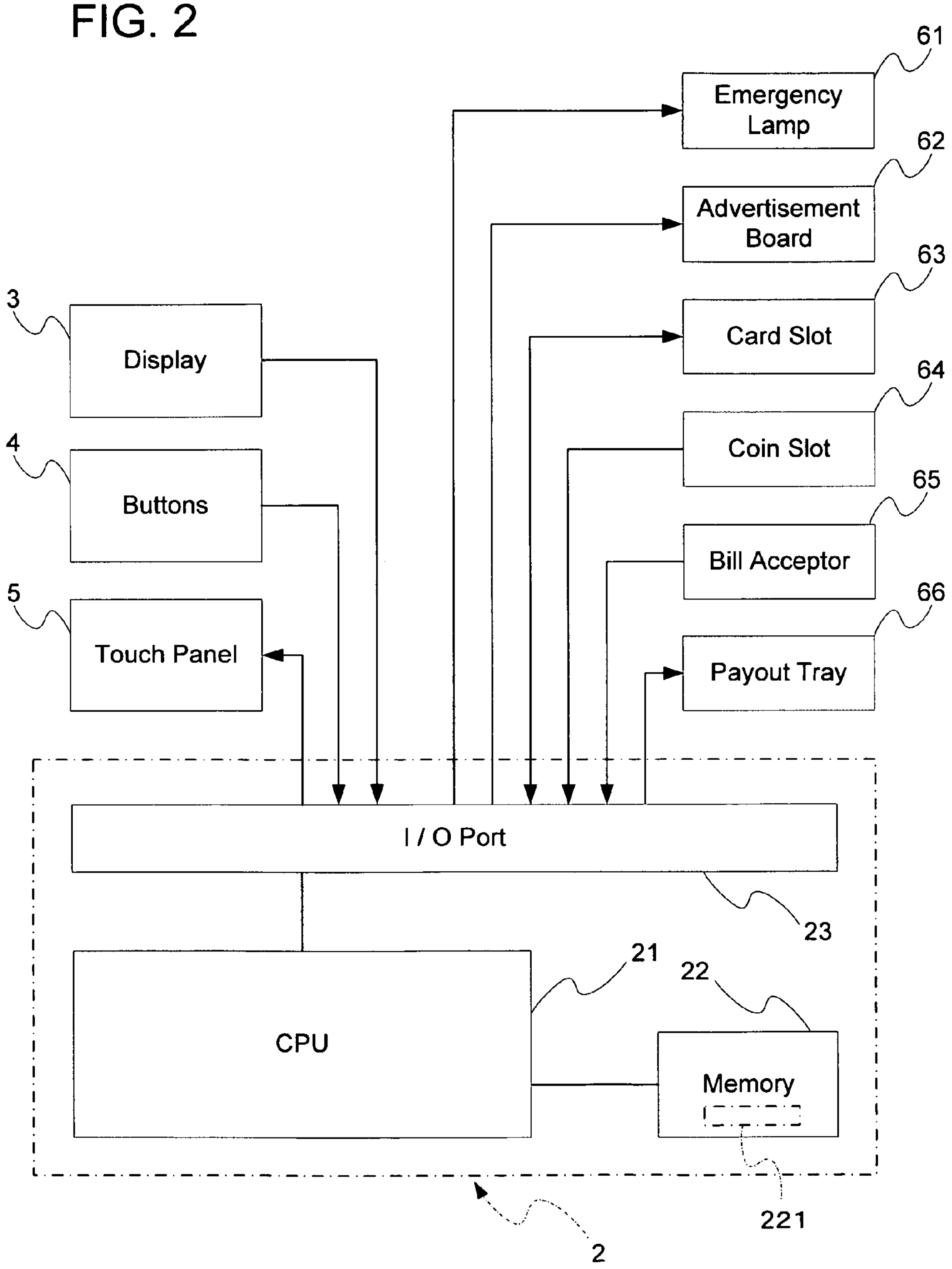
FIG. 2 is a block diagram illustrating input/output connections between the components of the gaming machine shown in FIG. 1.

All the components of the gaming machine 1 described above are controlled by the controller 2, which is installed inside of the gaming machine 1. FIG. 2 is a block diagram illustrating input/output connections between the components of the gaming machine 1. As shown in this figure, the display 3, buttons 4, touch panel 5, emergency lamp 61, advertisement board 62, card slot 63, coin slot 64, bill acceptor 65, and payout tray 66 are all electrically connected to the controller 2. The controller 2 is composed of a central processing unit (CPU) 21, a memory 22 and an input/output (I/O) port 23. The CPU 21 is arranged to run a computer program written in the memory 22. The memory 22 is designed not only to provide the program to the CPU 21 but also to store temporary data including values sent from the CPU 21. Based on the program and data stored in the memory 22 and inputs from the buttons 4, touch panel 5, card slot 63, coin slot 64 and bill acceptor 65 via the I/O port 23, the CPU 21 generates timely image of the game. Then, the generated image is shown on the display 3 as an output. The CPU 21 also moves image components, such as symbols, shown in the display 3. Since the CPU 21 generates concrete and substantial slot images on the display 3, the player recognizes the game as real. When necessary, the CPU 21 also outputs to the emergency lamp 61, advertisement board 62, card slot 63 and payout tray 66 via the I/O port 23 for proper operation of the gaming machine 1. Accordingly, in the gaming machine 1, the game is substantially controlled by the controller 2 generating timely game images on the display 3. Furthermore, all the Examples described below are substantially realized by software stored in the memory 22. Thus, the gaming machine 1 can carry out all the Examples described below without replacing the hardware components, by just running a selected program written in the memory 22.

To make the explanation plain, the below explanation just says 'the gaming machine 1 does something' or 'the gaming machine 1 shows something'. Because of the architecture of the gaming machine 1 described above, these phrases usually mean 'the controller 2 does something' or 'the controller 2 shows something on the display 3'. Also, in the following Examples, there are expressions 'something is shown' or 'something is somewhere'. Such expressions generally mean 'something is shown on the display 3' or 'something is somewhere in the display 3'

§2. EXAMPLE 1

In this section, Example 1 is explained, using FIGS. 3-10.

§2.1. DESIGN OF EXAMPLE 1

Figure 3:
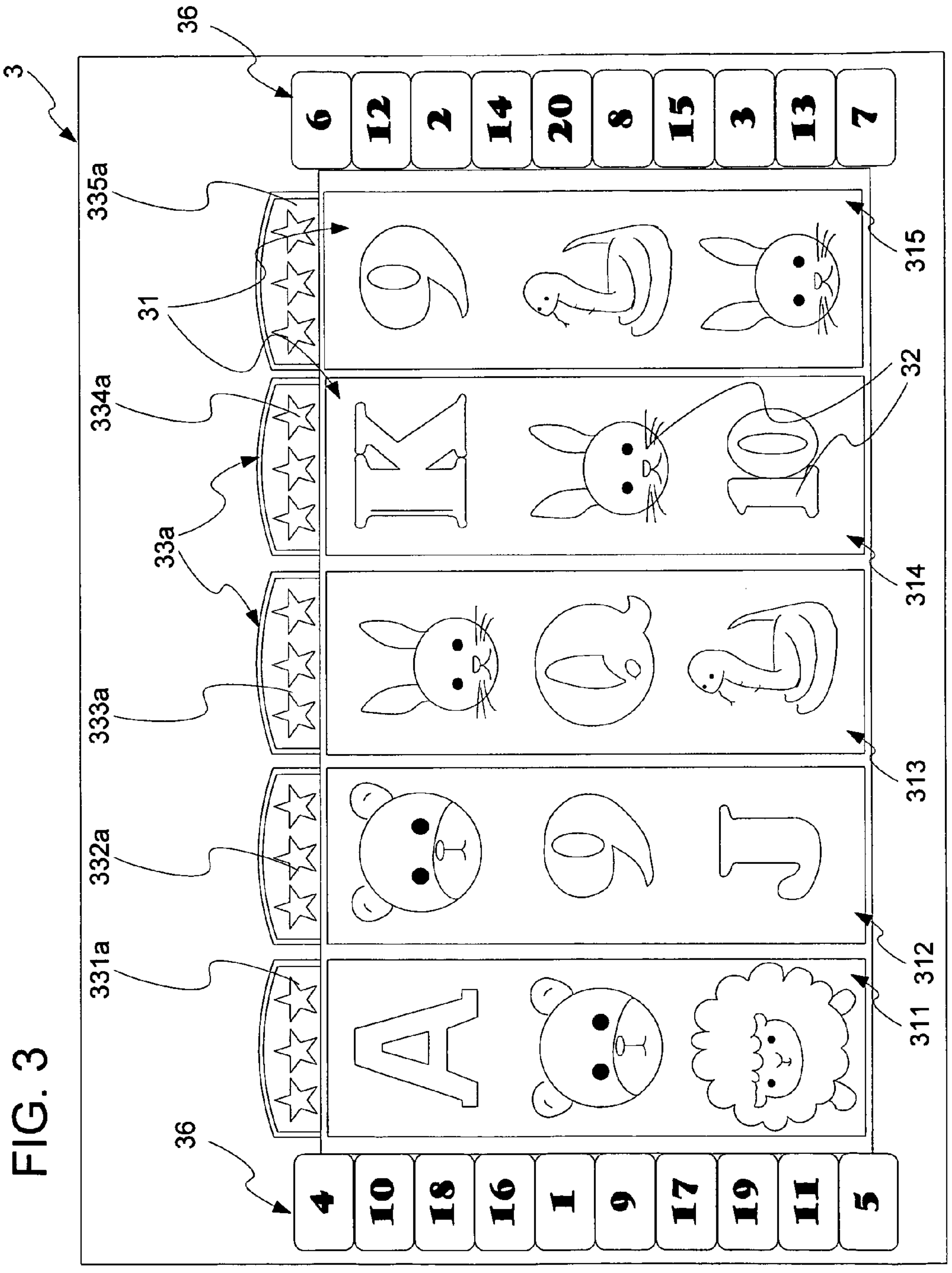
FIG. 3 is a display image to explain Example 1 of the present invention.

FIG. 3 is a basic image of Example 1. As shown in this figure, the display 3 shows reels 31 having aligned symbols 32, gauges 33*a* and pay lines 36. The reels 31 are located in the center of the display 3. The reels 31 are made up of five reels. From left to right, the reel is called a first reel 311, second reel 312, third reel 313, fourth reel 314 and fifth reel 315 respectively. Each reel has a group of symbols in the display 3, which is composed of three symbols 32. Each symbol 32 represents a specific image (such as bear, rabbit, sheep or snake), letter (such as A, J, K, Q or 9) or their combination (such as Wild symbol 321 in FIG. 4). The symbols 32 are aligned by three in rows and five in columns. Thus, each column corresponds to each reel in the display 3.

Near the reels 31, exactly speaking above the reels 31, gauges 33*a* are arranged. The biggest feature of this Example is that the gaming machine 1 provides the gauges 33*a*. The existence of the gauges 33*a* enables the gaming machine 1 to provide the players exciting games.

The gauges 33*a* are made up of five gauges. From left to right, the gauge is called a first gauge 331*a*, second gauge 332*a*, third gauge 333*a*, fourth gauge 334*a* and fifth gauge 335*a* respectively. Each gauge 33*a* corresponds to each reel 31 adjacent to each other. In other words, the first gauge 331*a* corresponds to the first reel 311, the second gauge 332*a* corresponds to the second reel 312, the third gauge 333*a* corresponds to the third reel 313, the fourth gauge 334*a* corresponds to the fourth reel 314 and the fifth gauge 335*a* corresponds to the fifth reel 315. Therefore, in this Example, the total number of the gauges 33*a* is same as the total number of the reels 31.

Outside of the reels 31 lie pay lines 36 so that they sandwich the reels 31 between them. When the player plays the game, he/she selects the winning lines, pushing one of the LINE buttons 44. According to the buttons the player presses, some of the numbers in the pay lines 36 are selected. Each number represents a specific line that runs from the first reel 311 to the fifth reel 315 and that runs one of the three rows in each reel 31. This line is called the winning line and the player wins when same type of three or more symbols 32 (for example 'bear' symbols) aligns on the winning line consecutively.

When the player pushes one of the BET buttons 43 or MAX BET button 41 as well as one of the LINE buttons 44, the gaming machine 1 is ready to provide a game. Then, when the player pushes the SPIN button 45 the gaming machine 1 begins to move the symbols 32 from top to bottom as if the reels 31 are rotating from top to bottom. After a while, the gaming machine 1 stops the movement of the symbols 32 reel by reel from the first reel 311 to the fifth reel 315. Then, the arrangement of the symbols 32 changes, for example, like FIG. 4.

Figure 4:
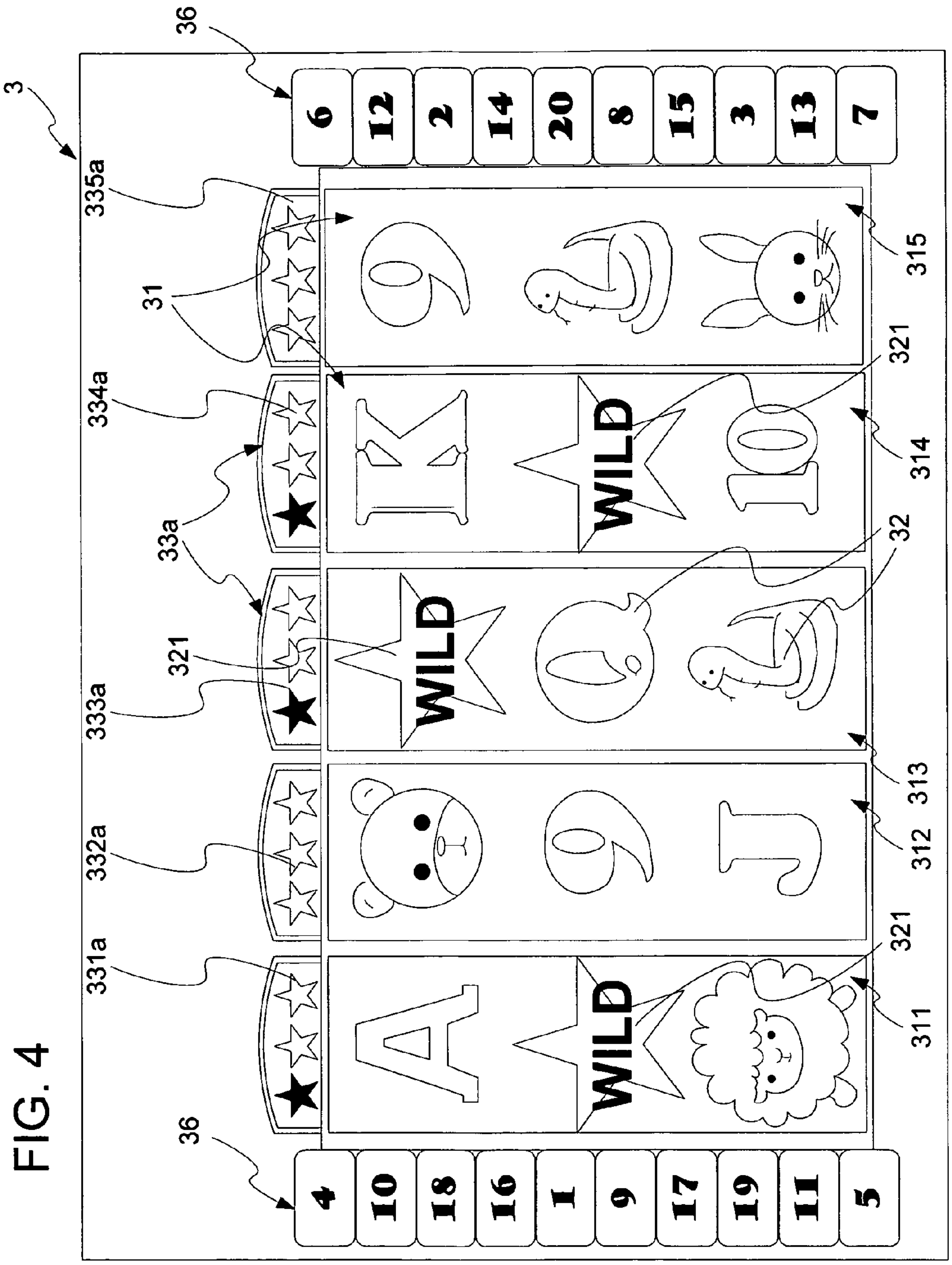
FIG. 4 is a display image to explain Example 1 of the present invention.

When a specific type of symbol, in this Example Wild symbol 321, shows up in the display 3, a value such as 'one' is added to the gauge 33*a* corresponding to the reel 31 where the Wild symbol 321 showed up. The Wild symbol 321 is a symbol that is compatible to any types of the symbol 32. In FIG. 4, the Wild symbols 321 appear in the first reel 311, third reel 313 and fourth reel 314. Thus, the values of the first gauge 331*a*, third gauge 333*a* and fourth gauge 334*a* are incremented. In other words, a certain value is added to the first gauge 331*a*, third gauge 333*a* and fourth gauge 334*a*.

As shown in FIG. 3, each gauge 33*a* has three 'star marks'. A 'white star mark' represents an empty or no value. The default values of the first to fifth gauges 331*a* to 335*a* are zero in the beginning. That's why all the gauges 31 are filled with only 'white star marks'.

As shown in FIG. 4, when the value 'one' is added to the first gauge 331*a*, third gauge 333*a* and fourth gauge 334*a*, one 'white star mark' is replaced with one 'black star mark', which represents a value 'one'. In other words, one mark, which represents a value 'zero', is replaced with other mark, which represents a value 'one'.

Figure 5:
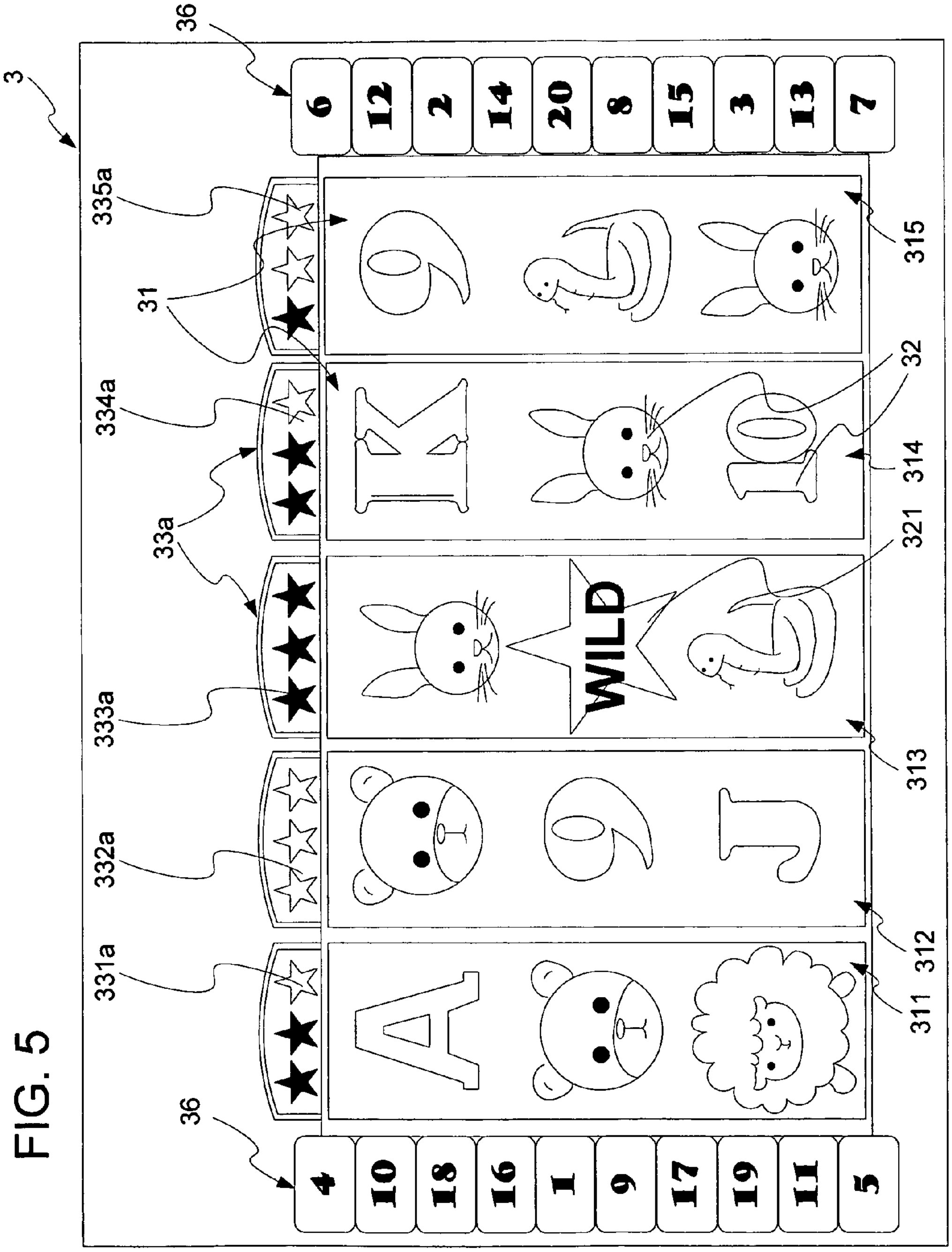
FIG. 5 is a display image to explain Example 1 of the present invention.

After several more spins, the gauges 33*a* may become as shown in FIG. 5. This figure is a good example to explain the status of the gauges 33*a*. The second gauge 332*a* has no 'black star marks', which represents the value 'zero'. The fifth gauge 335*a* has one 'black star mark', which represents the value 'one'. The first and fourth gauges 331*a* and 334*a* have two 'black star marks', which represent the value 'two'. Lastly, the third gauge 333*a* has three 'black star marks', which represent the value 'three'. In short, the values of the first gauge 331*a* to fifth gauge 335*a* represent the numbers of how many time the Wild symbols 321 show up in the first reel 311 to fifth reel 315 respectively.

Figure 6:
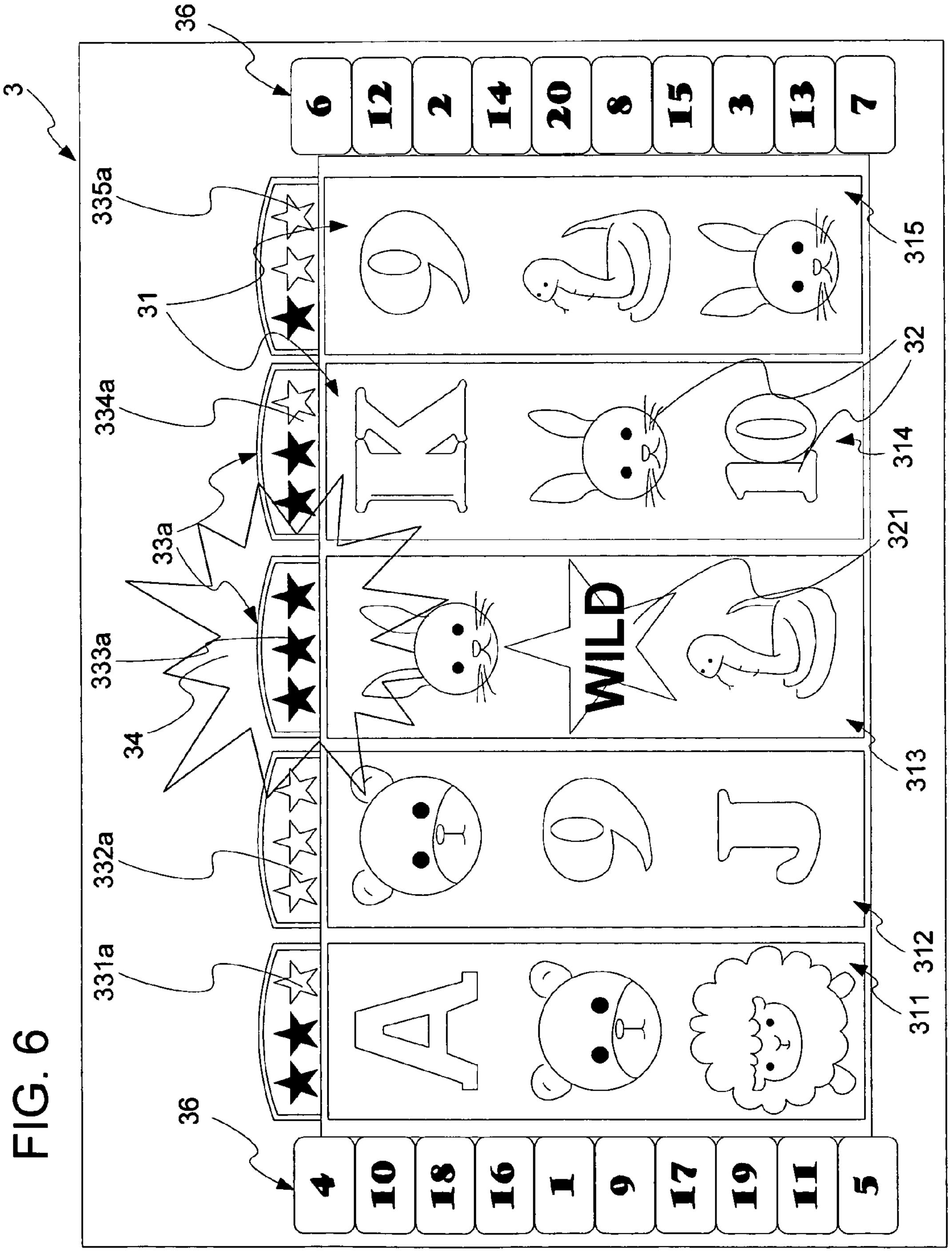
FIG. 6 is a display image to explain Example 1 of the present invention.

As shown in FIG. 5, the Wild symbol 321 is in the third reel 313. Thus, the third gauge 333*a* contains three 'black star marks' by the last spin and 'no white star marks'. This means the value of the third gauge 333*a* reached a threshold, whose value is 'three'. Then, as shown in FIG. 6, a visual effect 34 is shown on the third gauge 333*a* and the third reel 313. In this Example, an explosion image is shown on the third gauge 333*a* and the reel 313.

Figure 7:
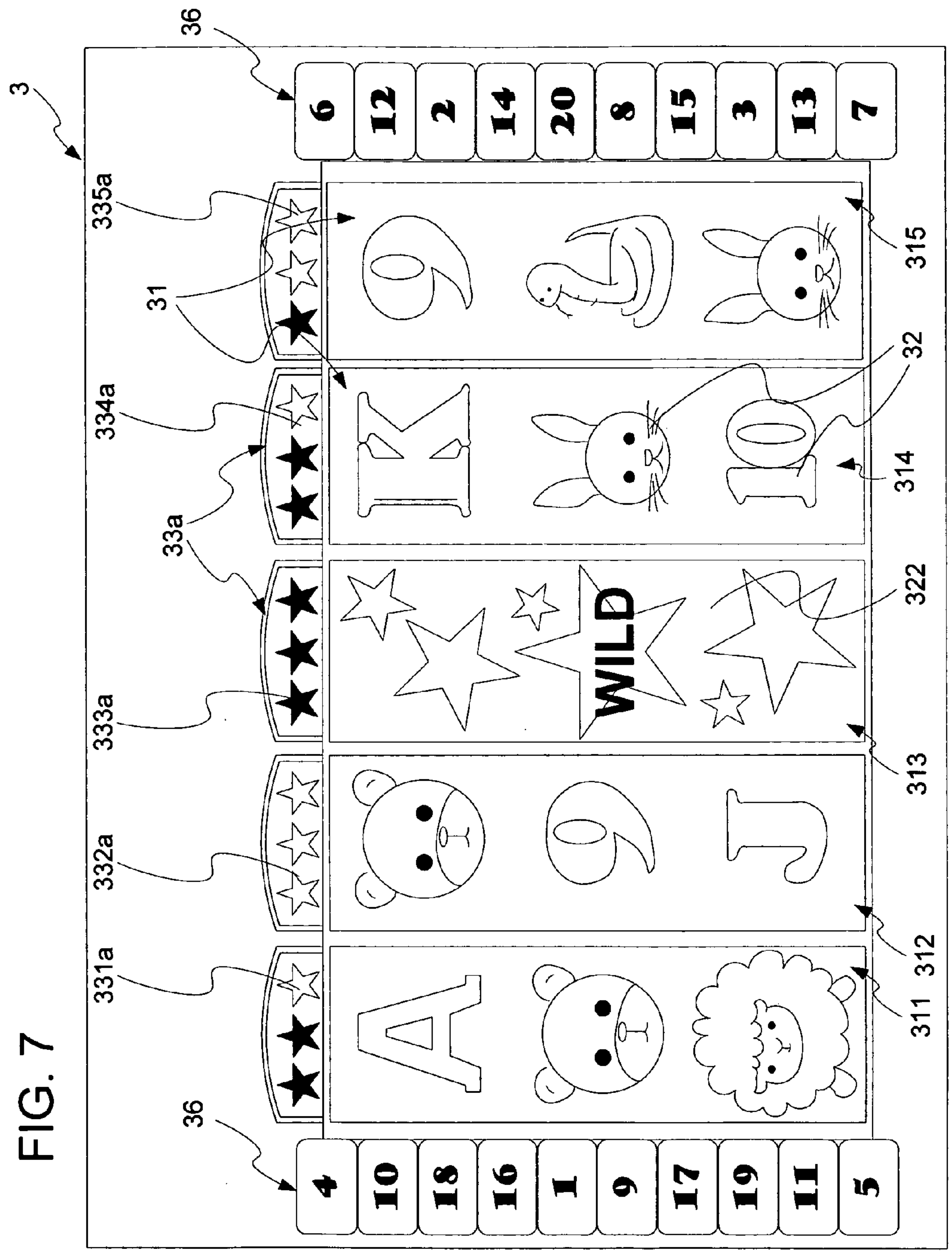
FIG. 7 is a display image to explain Example 1 of the present invention.

As shown in FIG. 7, after the explosion occurs, all the symbols 32 in the third reel 313 change into an Entire Reel Wild (also called Full Reel Wild) symbol 322, which works as a Wild symbol in all the rows in the third reel 313 in the display 3. In a functional view of the symbols 32, this is equivalent to what all the three symbols in the third reel 313 change to Wild symbols 321. More exactly speaking, since the middle symbol 32 is already the Wild symbol 321, the show-up of the Entire Reel Wild symbol 322 is functionally equivalent to what other non-Wild symbols 32 in the third reel 313 change into Wild symbols 321.

Figure 8:
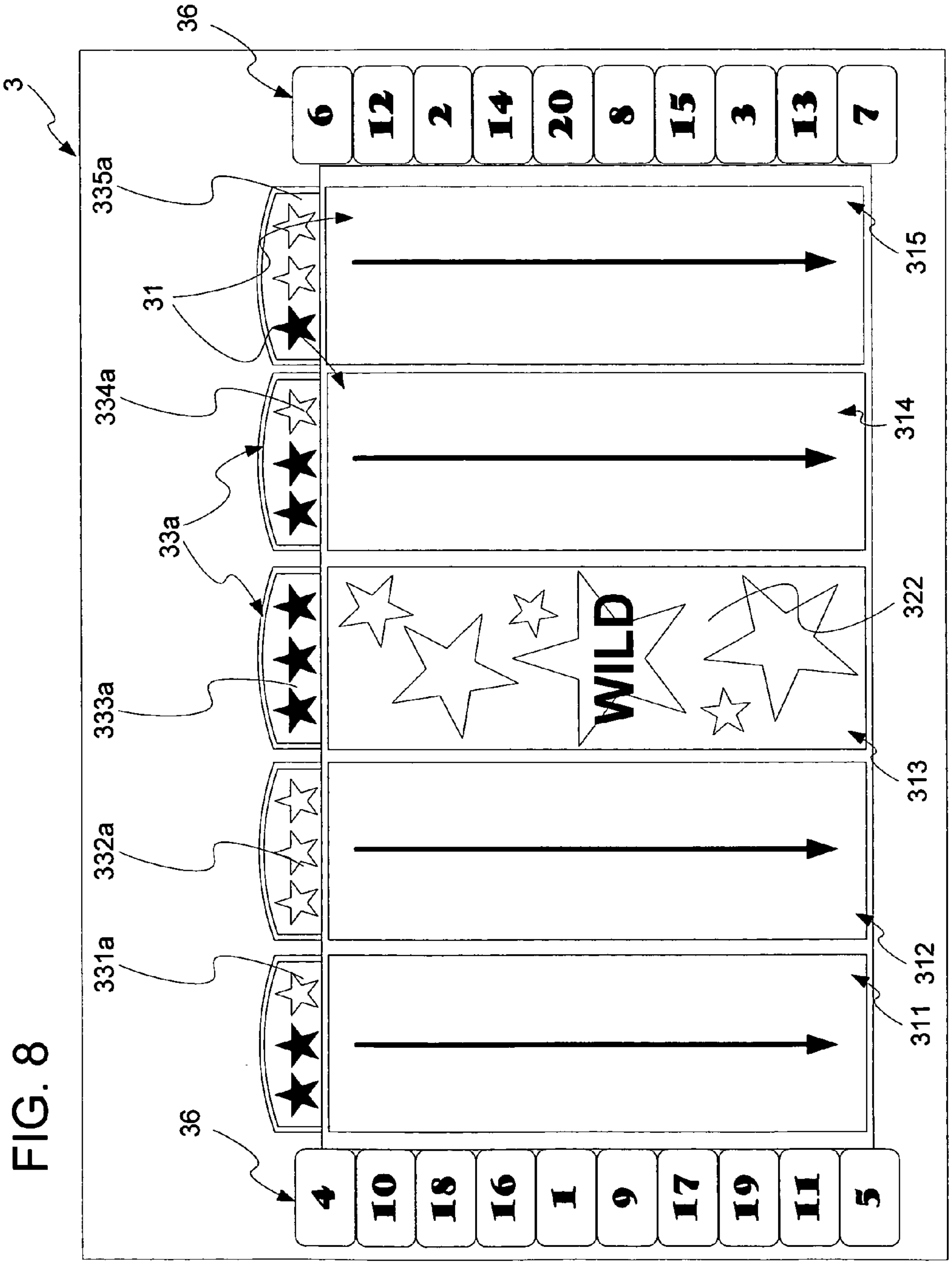
FIG. 8 is a display image to explain Example 1 of the present invention.
Figure 9:
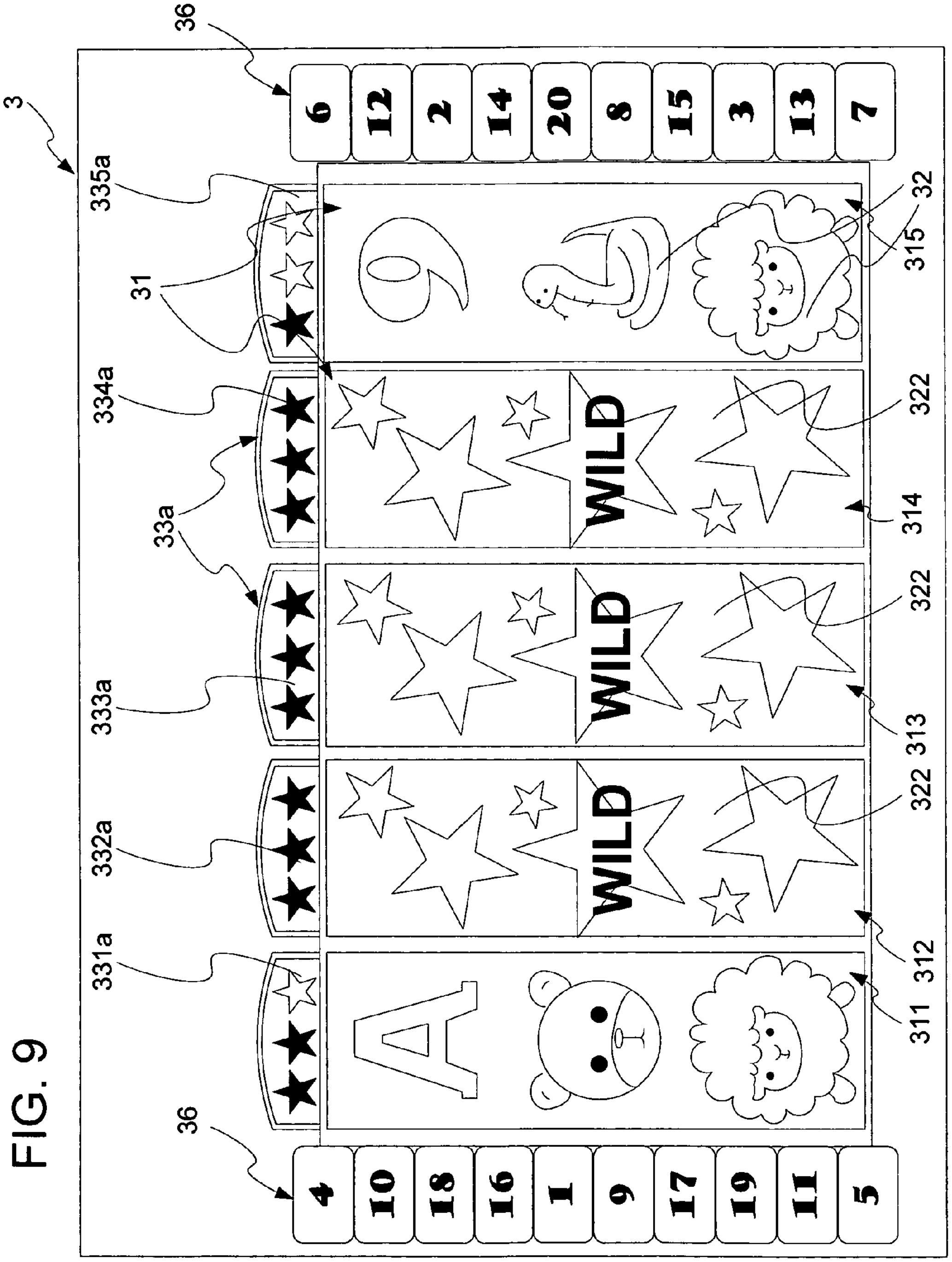
FIG. 9 is a display image to explain Example 1 of the present invention.

As shown in FIG. 8, once the third gauge 313 turns to the Entire Reel Wild symbol 322, other reels begin to spin without accepting a bet and without accepting the instruction to spin from the player. During the spin, the third reel 313 remains Entire Reel Wild symbol 322. Then other reels 31 stop one by one eventually. Since the symbol 32 in the third reel 313 is the Entire Reel Wild symbol 322, the winning chance in this spin is higher. This means, in a view point of the gaming machine 1, that the gaming machine 1 performs a process which increases a winning chance to the player on the third reel 313 whose corresponding gauge, the third gauge 333*a* reaches the threshold. This enables the gaming machine 1 to provide more exciting games to the player.

If the status of the gauges 33*a* is like FIG. 5, the player can't help but imagine that exciting events may happen soon on the first reel 311 and fourth reel 314 other than the third reel 313. Therefore, the player would hesitate to leave the gaming machine 1 and may spend more money than usual. Such volatility is brought by the existence of the gauges 33*a* that correspond to their respective reels 31.

In this Example, the Wild symbol 321 is the trigger to increase the value of the gauge and to initiate the feature, which is an event that brings a benefit to the player. The advantage of setting the Wild symbol 321 as the trigger for the feature as a specific type of symbol is that it is easy to design various stimulating features in the wake of the appearance of the Wild symbol 321.

In this Example, the Entire Reel Wild symbol 322 appears as a feature when the value of the gauge reaches the threshold. This makes the player expect to win a larger award and the game is more exciting. In a lucky case, plural gauges can reach the threshold at the same time and the Entire Reel Wild symbols 322 can appear in the plural reels like FIG. 9. In this figure, the second gauge 332*a*, third gauge 333*a* and the fourth gauge 334*a* are at the threshold level and the Entire Reel Wild symbols 322 show up in the second reel 312, third reel 313 and fourth reel 314. If such a situation happens in the actual game, the player will be ecstatic and enthralled and may be addicted to the gaming machine 1.

In this Example, the feature is confined to each of the reels 31. Such an arrangement realizes a good game balance in that the gaming machine 1 doesn't have to pay too much awards to the player at one time but can pay proper amounts of awards frequently so as to stimulate the player's motivation.

In this Example, the feature is initiated after the visual effect 34 is illustrated. Both the visual effect and the feature catch the player's eye. Thus, showing the visual effect and the feature in this order will delight the player a lot.

Furthermore, in this Example, the gaming machine 1 provides a free spin after the feature shows up, which is the appearance of the Entire Reel Wild Symbol 322. Such a free game will further delight the player.

In this Example, the total number of the gauges 33*a* is same as the total number of the reels 31. This arrangement is easy to design because it has a beauty of unity. In addition, this design is easy for the players to understand the concept of the gauges 33*a*. Therefore, such an arrangement gives the game designers flexibility to design a game and makes it easy for the players to understand the concept of the game.

§2.2. OPERATION OF EXAMPLE 1

Figure 10:
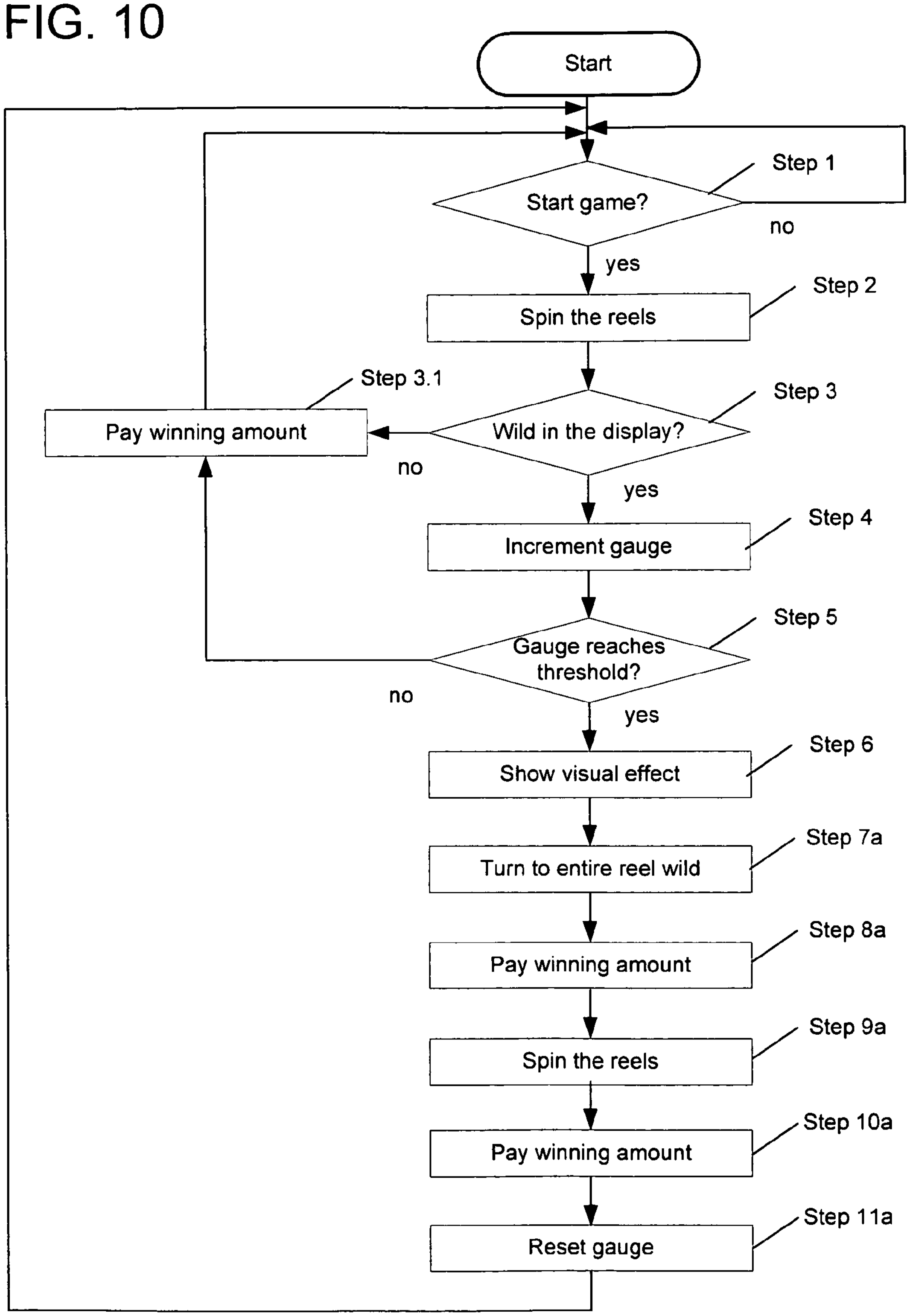
FIG. 10 is a flowchart describing an operation of Example 1 of the present invention.

Next, the operation of the gaming machine 1 in this Example is explained based on FIG. 10.

To run a below operation, the gaming machine 1 needs to count the number of how many times the Wild symbol 321 shows up in the display 3 by reel and memorize it as a data. To do so, as shown in FIG. 2, the controller 2 has a counter 221 in some area of the memory 22. In other words, the controller 2 assigns a specific area in the memory 22 as a counter 221 that memorizes the value corresponding to the number of how many times the Wild symbol 321 shows up in the display 3 in each reel 31.

Upon starting the game, the below operation premises the fact that the player paid a money to the gaming machine 1 and the gaming machine 1 converted the accepted money to a certain amount of credit.

<Step 1> When the gaming machine 1 receives an instruction to start a game from the player, the operation shifts from Step 1 to Step 2. This instruction is composed of pressing the following three buttons by the player: 1) one of the BET buttons 43 or MAX BET button 41, 2) one of the LINE buttons 44 and 3) the SPIN button 45. Unless the player instructs to initiate the game, the gaming machine 1 stalls at Step 1. At this Step, the image on the display 3 may be like FIG. 3.

<Step 2> Once the SPIN button 45 is pressed by the player, the gaming machine 1 spins the reels 31. Of course the gaming machine stops the reels 31 after a while. Then the image on the display 3 may be like FIG. 4.

<Step 3> The gaming machine 1 judges whether the Wild symbol 321 is in the display 3 reel by reel. If there is no Wild symbol 321, the operation branches to Step 3.1. If there is a Wild symbol 321 in the display 3 like FIG. 4, the operation forwards to Step 4.

<Step 3.1> The gaming machine 1 calculates the winning amount of the game based on the symbols 32 aligned on the winning lines. Then the gaming machine 1 returns the winning amount of credit to the player if the winning amount is not zero. Then, the operation goes back to Step 1.

<Step 4> The gaming machine 1 increments the value in the counter 221 that corresponds to the reel 31 where the Wild symbol 321 shows up. Also, the gaming machine 1 reflects the values stored in the counter 221 to the gauges 33*a* based on each reel 31. Thereby, some 'white star marks' turn into 'black star marks' as shown in FIG. 4.

<Step 5> The gaming machine 1 judges whether the gauge 33*a* has reached the threshold. In other words, the gaming machine 1 judges whether the value in the counter 221 has reached the threshold reel by reel. If the value is below the threshold, the operation branches to Step 3.1. While repeating the Steps 1 to 5, the image on the display 3 may become like FIG. 5. If the value in the counter 221 is the same or above the threshold, the operation proceeds to Step 6.

<Step 6> The gaming machine 1 shows the visual effect 34 like FIG. 6.

<Step 7a> The gaming machine 1 changes the symbols 32 whose corresponding gauge 33*a* has reached the threshold. For example, in FIGS. 6 to 7, since the third gauge 333*a* has reached the threshold, the group of the symbols 32 in the third reel 313, which corresponds to the third gauge 333*a*, is transformed to the Entire Reel Wild symbol 322.

<Step 8a> The gaming machine 1 calculates the winning amount of the game, same as Step 3.1, assuming that all the symbols 32 in the reel 31, whose corresponding gauge 33*a* reached the threshold, are the Wild symbol 321. For example, in FIG. 7, the gaming machine 1 calculates the winning amount as if all the symbols 32 in the third reel 333*a* are the Wild symbols 321. Then, the gaming machine 1 returns the winning amount of credit to the player if the winning amount is not zero.

<Step 9a> The gaming machine 1 spins the reels 31 except the reel 31 where the Entire Reel Wild symbol 322 showed up. For example, in FIG. 8, the gaming machine 1 spins the first, second, fourth and fifth reels 311, 312, 314 and 315, leaving the third reel 313 the Entire Reel Wild symbol 322. The gaming machine 1 stops the rotating reels 31 after a while.

<Step 10a> The gaming machine 1 calculates the winning amount of the game and pays back the winning amount of credit to the player as described in the Step 8a.

<Step 11a> The gaming machine 1 resets the value in the counter 221 and the gauge 33*a* whose corresponding reel 31 was a subject of the feature. For example, after finishing the game shown in FIG. 8, the gaming machine 1 resets the value in the counter 221 corresponding to the third reel 313 and sets the value in the gauge 333*a* same as the reset value in the counter 221. This means that all the 'black star marks' in the gauge 333*a* become 'white star marks', which indicate 'zero'. Then, the operation goes back to Step 1.

Like this Example, if the gaming machine 1 resets the gauge 31 whose value reaches the threshold, the game rule becomes simpler and easier for the player to understand.

§3. EXAMPLE 2

Figure 11:
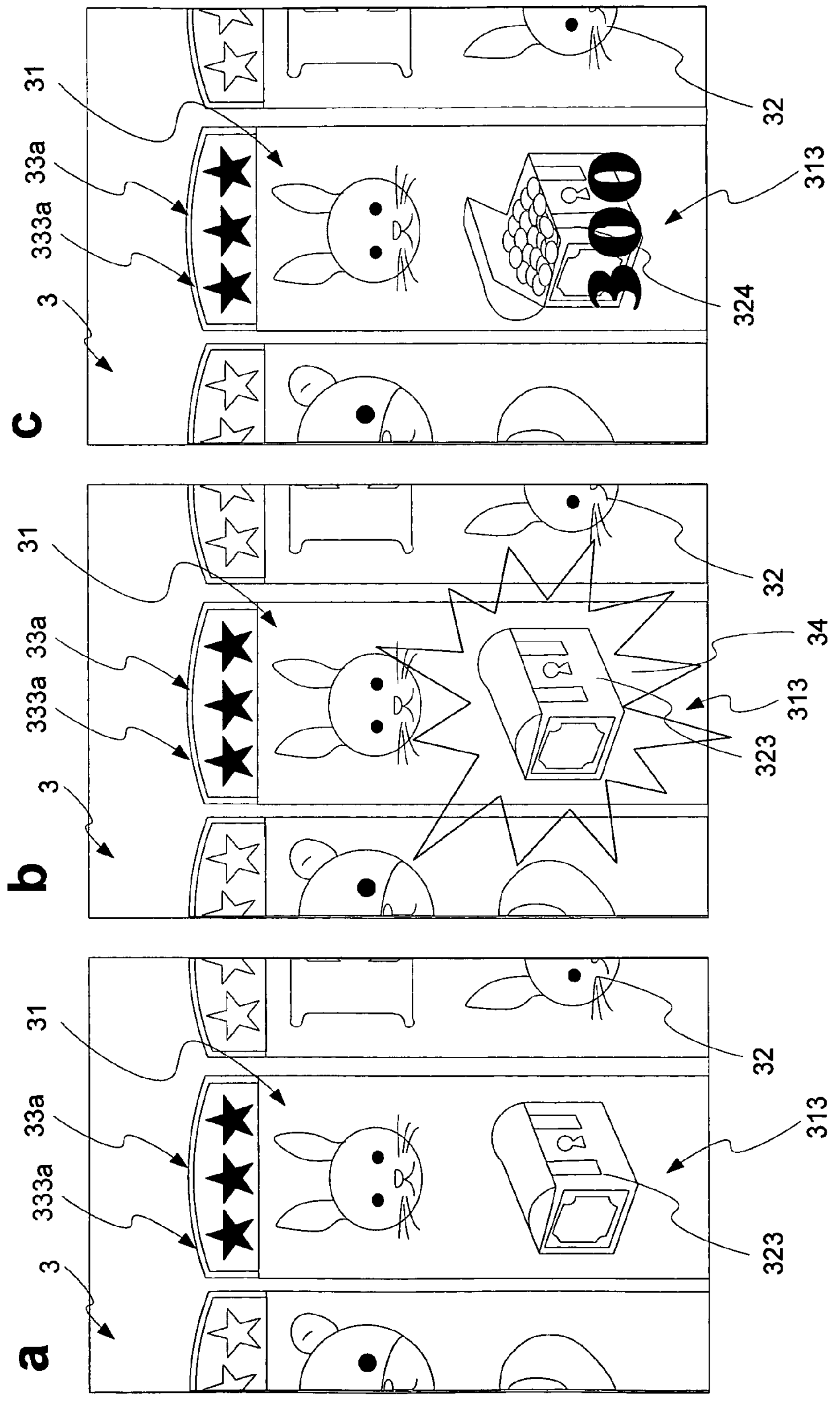
FIG. 11 is a display image to explain Example 2 of the present invention.
Figure 12:
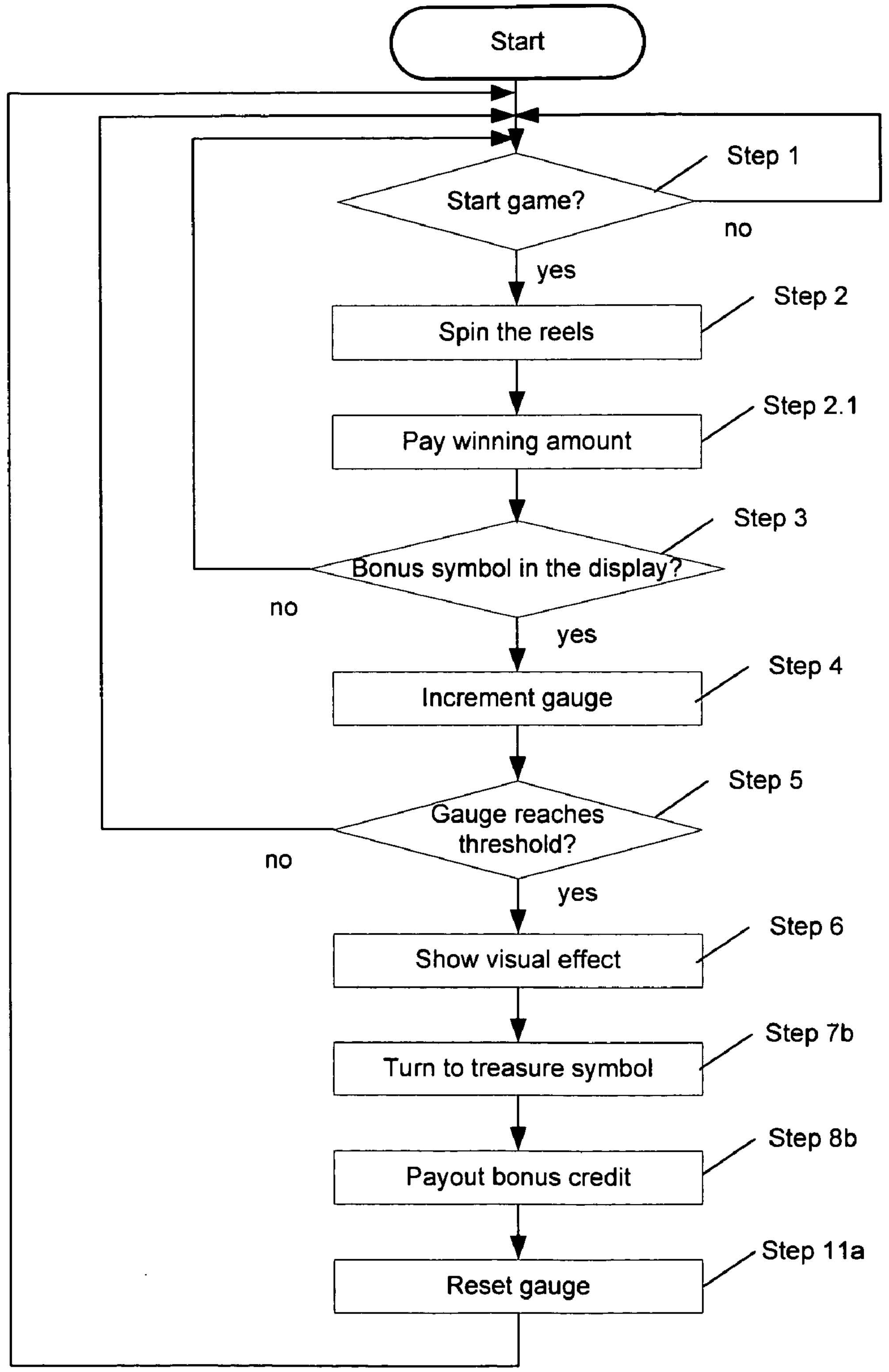
FIG. 12 is a flowchart describing an operation of Example 2 of the present invention.

In this section, Example 2 is explained, using FIGS. 11-12. Below, only the things that are different from the things in Example 1 are explained and the same explanations are omitted.

§3.1. DESIGN OF EXAMPLE 2

As show in FIG. 11*a*, the Wild symbol 321 is replaced by a Bonus symbol 323, which illustrates a treasure box. This means that the specific type of symbol in this Example is the Bonus symbol 323. Each time the Bonus symbol 323 shows up in the display 3, a certain value is added to the gauge 33*a* corresponding to the reel 31 where the Bonus symbol 323 shows up. In the FIG. 11*a*, since the Bonus symbol 323 appears in the third reel 313, a certain value is added to the value in the counter 221 corresponding to the third reel 313 and the value in the counter 221 is reflected to the third gauge 333*a*.

As shown in FIG. 11*b*, since the value in the third gauge 333*a* reaches the threshold, the visual effect 34 is provided on the Bonus symbol 323 and the third reel 313. That's why the Bonus symbol 323 is exploding in FIG. 11*b*.

Then, as shown in FIG. 11*c*, the Bonus symbol 323 opens and turns into a Treasure symbol 324, which is another type of symbol. The Treasure symbol 324 brings a payment of a bonus credit to the player even when the consecutive Treasure symbols 324 are not on a winning line.

In this Example, the feature is a payout of a bonus credit to the player brought by the emergence of the Treasure symbol 324. This Example gives the player chances to win a bonus credit even when the same symbols 32 do not align on the winning line. Therefore, in this game, the player can expect other form of win than aligning the symbols. When the player sees the Bonus symbol 323 open, he/she will be very happy.

§3.2. OPERATION OF EXAMPLE 2

Below, only the operations that are different from those in Example 1 are described, using FIG. 12.

<Steps 1 & 2> The gaming machine 1 starts a game and spins the reels 31.

<Step 2.1> After the reels 31 stop, the gaming machine 1 calculates and returns a winning amount of credit to the player, same as Step 3.1 in Example 1.

<Step 3> The gaming machine 1 judges whether the Bonus symbol 323 is in the display 3 reel by reel. If there is no Bonus symbol 323, the operation goes back to Step 1. If there is a Bonus symbol 323 in the display 3, the operation proceeds to Step 4.

<Step 4> The gaming machine 1 increments the value in the counter 221 that corresponds to the reel 31 where the Bonus symbol 323 shows up. Also, the gaming machine 1 reflects the values stored in the counter 221 to the gauges 33*a* based on each reel 31.

<Step 5> The gaming machine 1 judges whether the gauge 33*a* reached the threshold like Step 5 in Example 1. If the value is below the threshold, the operation goes back to Step 1. If the value in the counter 221 is the same or above the threshold like FIG. 11*a*, the operation proceeds to Step 6.

<Step 6> The gaming machine 1 shows a visual effect 34 like FIG. 11*b*.

<Step 7b> The gaming machine 1 changes the Bonus symbol 323 into the Treasure symbol 324 as shown in FIG. 11*c*.

<Step 8b> The gaming machine 1 calculates the amount of bonus credit based on the number of the Treasure symbols 324 that appeared in the display 3. Then, the gaming machine 1 rewards the calculated amount of bonus credit to the player.

<Step 11a> The gaming machine 1 resets the value in the counter 221 and the gauge 33*a* as described in Example 1. Then, the operation goes back to Step 1.

§4. EXAMPLE 3

Figure 13:
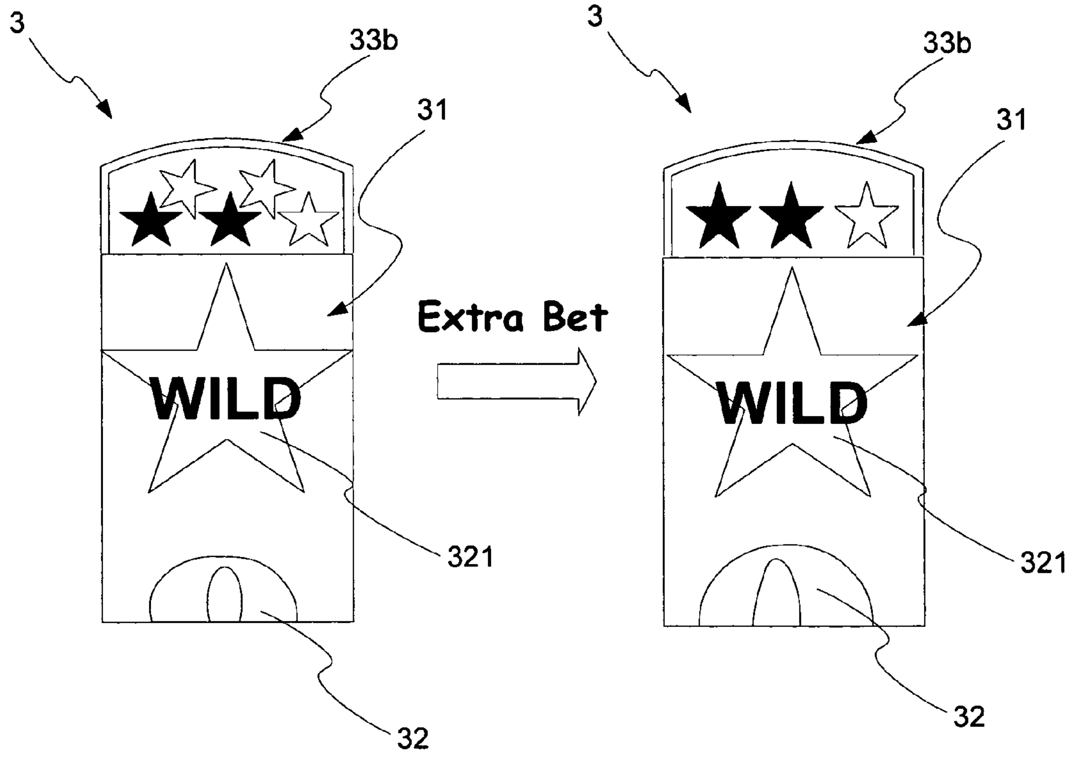
FIG. 13 is a display image to explain Example 3 of the present invention.
Figure 14:
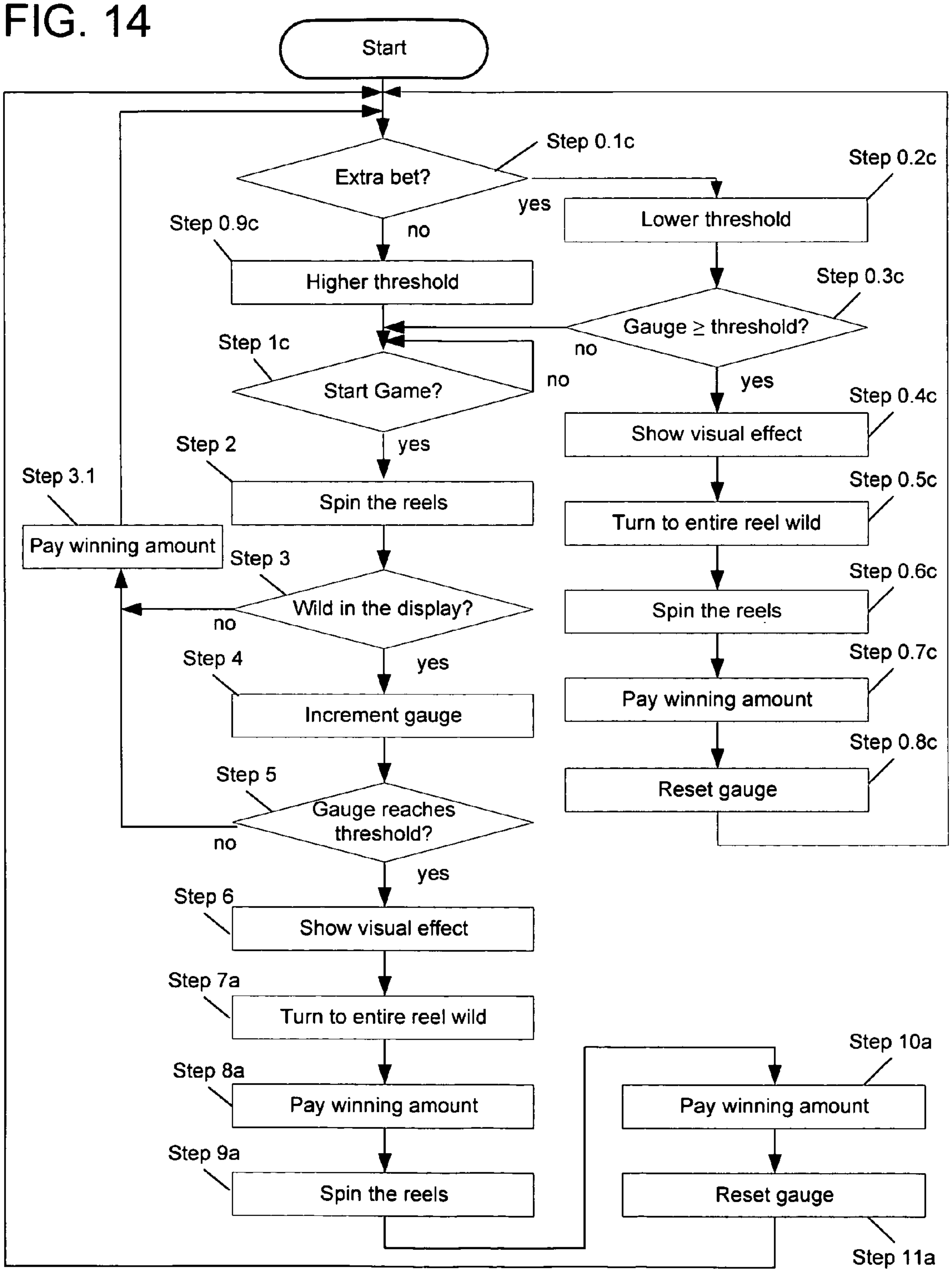
FIG. 14 is a flowchart describing an operation of Example 3 of the present invention.

In this section, Example 3 is explained, using FIGS. 13-14. Below, the only things that are different from the things in Example 1 are explained and the same explanations are omitted.

§4.1. DESIGN OF EXAMPLE 3

As show in FIG. 13 left, the gauges 33*b* have five 'star marks' in the beginning. This means the value of the threshold is 'five'. As shown in FIG. 1, the gaming machine 1 has the Extra BET button 46. In this Example, the Extra BET button 46 is activated and the gaming machine 1 accepts an instruction of extra bet from the player. The extra bet is not a direct bet to activate the winning line but an additional bet of credit to trigger a feature or event that brings a benefit to the player. In this Example, once the Extra BET button 46 is pressed by the player, the gaming machine 1 lowers the threshold value of the gauge 33*b* and the counter 221. As shown in FIG. 13 right, after receiving the input of the extra bet, the gaming machine 1 set the threshold value of the gauge 33*b* down to 'three' from 'five'. That's why the gauges 33*b* have three 'star marks' in FIG. 13 right, which represent the threshold value 'three'.

This design provides an advantage to the player who pays more. In addition, since the player can decide the timing when he/she bets the extra bet, the player can control the probability of the appearance of the feature at some degree. This makes the game more tactical.

§4.2. OPERATION OF EXAMPLE 3

Below, only the operations that are different from those in Example 1 are described, using FIG. 14. This operation has two main stream lines of flow. One stream line is the flow (Steps 0.4c-0.8c) after the value of the gauge 33*b* reaches or goes over the threshold when the player pushes the Extra BET button 46. The other stream line is the flow (Steps 1c-11a) after the value of the gauge is still below the threshold even after the player pushes the Extra BET button 46.

<Step 0.1c> The gaming machine 1 judges whether the Extra BET button 46 was pressed by the player. In other words, the gaming machine 1 judges whether it has received an input of an extra bet. When the gaming machine 1 has got the input of the extra bet, the operation moves to Step 0.2c. Otherwise, the operation proceeds to Step 0.9c.

<Step 0.2c> The gaming machine 1 lowers the threshold value of the gauges 33*b* and the counter 221. Thereby, the gauges 33*b* change from FIGS. 13 left to right.

<Step 0.3c> The gaming machine 1 judges whether the value of the gauge 33*b* is same or above the threshold value. If the value is below the threshold, the operation jumps to Step 1c. If the value is the same or above the threshold, the operation proceeds to Step 0.4c.

<Step 0.4c> The gaming machine shows the visual effect 34 on the reel 31 and the gauge 33*b* whose value is the same or above the threshold like FIG. 6.

<Step 0.5c> The gaming machine 1 changes the reel 31, whose corresponding gauge's value is the same or above the threshold, into the Entire Reel Wild Symbol 322 like FIG. 7.

<Step 0.6c> The gaming machine 1 spins the reels 31 except the reel 31, where the Entire Reel Wild symbol 322 showed up, like FIG. 8. The gaming machine 1 stops the rotating reels 31 after a while.

<Step 0.7c> The gaming machine 1 calculates and pays the winning amount of credit as Step 10a in Example 1.

<Step 0.8c> The gaming machine 1 resets the value in the counter 221 and the gauge 33*a* whose corresponding reel 31 was a subject of the feature. Then, the operation goes back to Step 0.1c.

<Step 0.9c> The gaming machine 1 increases the threshold value of the gauge 33*b* and the counter 221. More exactly speaking, the gaming machine 1 sets the threshold value to the original value for the gauge 33*b* without the extra bet. This changes the gauge 33*b* to be like FIG. 13 left.

<Steps 1c> The gaming machine 1 starts a game when the SPIN button 45 is pressed.

<Steps 2-11a> Same as Steps 2-11a in Example 1.

§5. EXAMPLE 4

Figure 15:
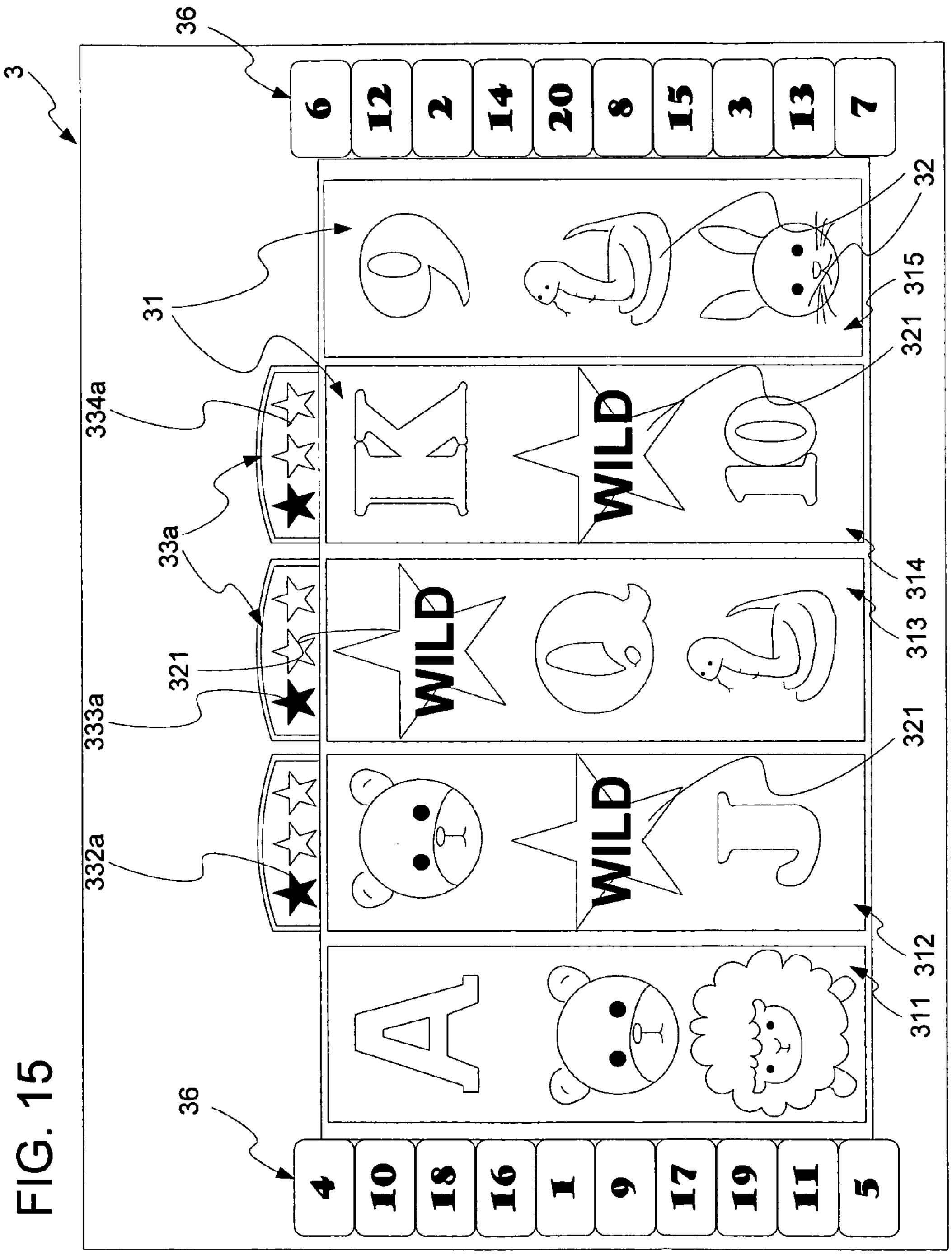
FIG. 15 is a display image to explain Example 4 of the present invention.

As shown in FIG. 15, in this Example, the total number of gauges 33*a* is less than the total number of reels 31. The gaming machine 1 has only three gauges 33*a* while it has five reels 31 because the gauges corresponding to the first and fifth reels 311 and 315 are omitted, though there remain the second, third and fourth gauges 332*a*, 333*a* and 334*a* that correspond to the second, third and fourth reels 312, 313 and 314, respectively.

Like this Example, if the number of gauges 33*a* is set smaller than that of the reels 31, the game designer can easily set the game balance so as to reconcile the casino's profit and player's benefit.

Since the operation of the gaming machine 1 in this Example is substantially the same as that in Example 1, the explanation of the operation in this Example is skipped.

§6. EXAMPLE 5

In this section, Example 5 is explained, using FIGS. 16-19. Below, the only things that are different from the things in Examples 1 and 2 are explained and the same explanations are omitted.

§6.1. DESIGN OF EXAMPLE 5

Figure 16:
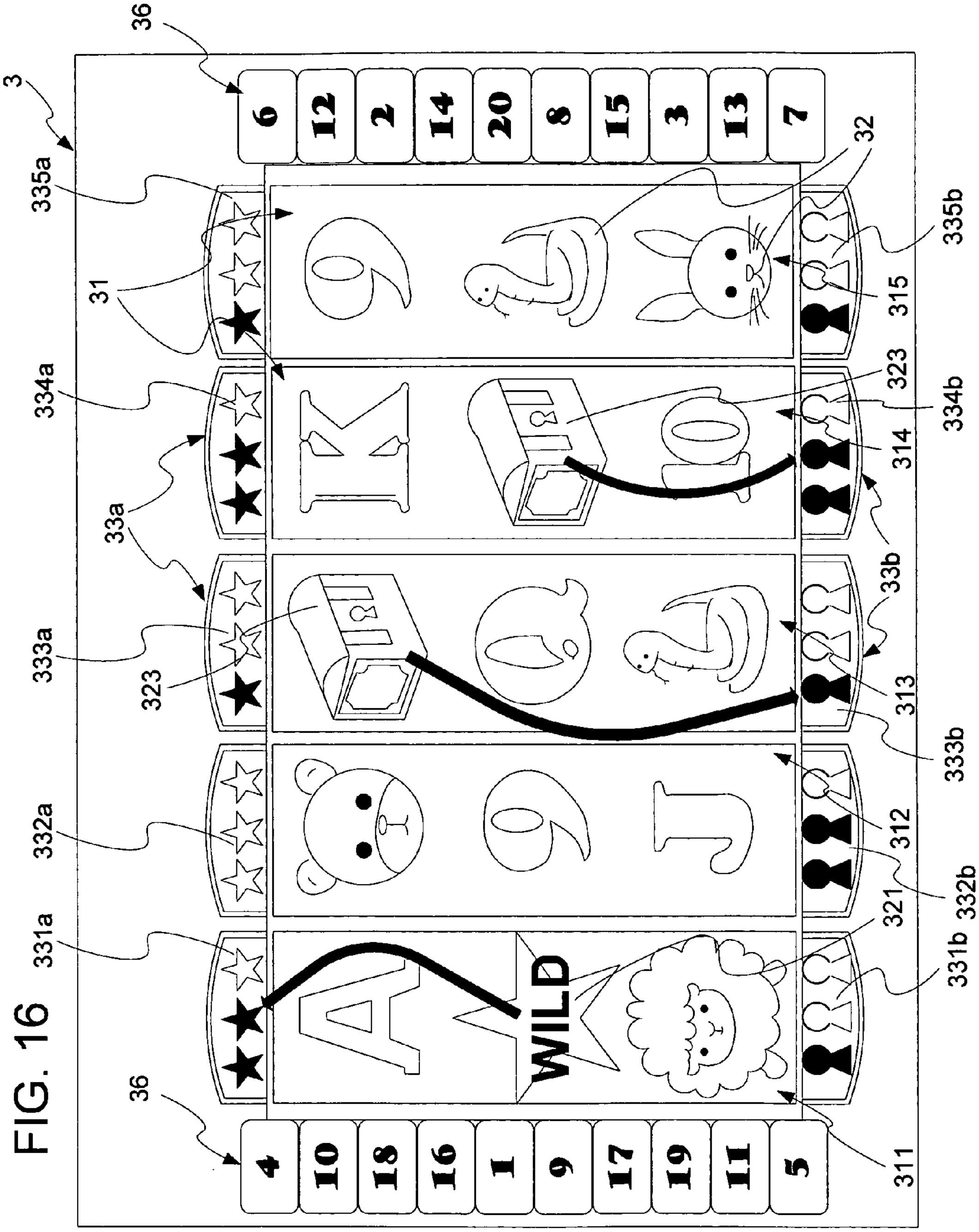
FIG. 16 is a display image to explain Example 5 of the present invention.

In this Example, the gaming machine 1 has plural gauges for one reel. As shown in FIG. 16, Wild gauges 33*a*, which are a first type of gauge, are provided above the reels 31. Also Bonus gauges 33*b*, which are a second type of gauge, are provided below the reels 31. From left to right, the top gauges are called a first Wild gauge 331*a*, second Wild gauge 332*a*, third Wild gauge 333*a*, fourth Wild gauge 334*a* and fifth Wild gauge 335*a* respectively. Likewise, the bottom gauges are called a first Bonus gauge 331*b*, second Bonus gauge 332*b*, third Bonus gauge 333*b*, fourth Bonus gauge 334*b* and fifth Bonus gauge 335*b* from left to right respectively.

Corresponding to theses gauge arrangements, the gaming machine 1 provides plural kinds of specific types of symbols 32 that are a Wild symbol 321 and a Bonus symbol 323. Each value of the Wild gauges 33*a* represents the counted number of how many times the Wild symbol 321 shows up in the display 3 according to each of the reels 31. Also, each value of the Bonus gauges 33*b* represents the counted number of how many times the Bonus symbol 323 shows up in the display 3 according to each of the reels 31. Thus, when the Wild symbol 321 shows up in one of the reels 31, the value in the corresponding Wild gauge 33*a* is increased. Likewise, when the Bonus symbol 323 shows up in one of the reels 31, the value in the corresponding Bonus gauge 33*b* is increased. In FIG. 16, since the Wild symbol 321 shows up in the first reel 311 and the Bonus symbol 323 show up in the third and fourth reels 313 and 314, certain amounts of values are added to the value of the first Wild gauge 331*a* and the values of the third and fourth Bonus gauges 333*b* and 334*b*.

Figure 17:
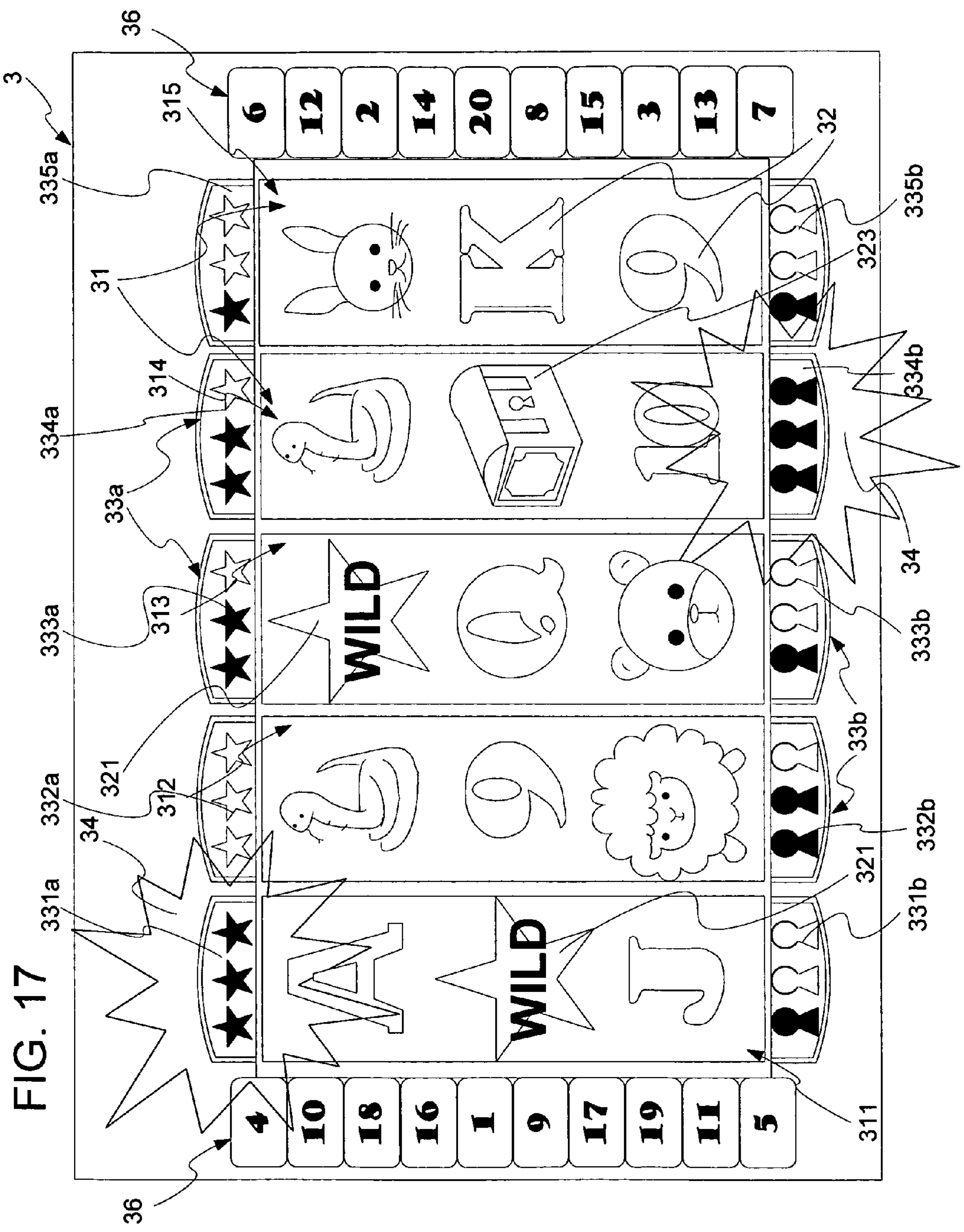
FIG. 17 is a display image to explain Example 5 of the present invention.

Once one of the Wild gauges 33*a* or Bonus gauges 33*b* reaches their thresholds, the gaming machine 1 shows a visual effect 34 on the Wild gauge 33*a* or Bonus gauge 33*b* whose value is same as, or above the threshold. In FIG. 17, since the values of the first Wild gauge 331*a* and the fourth Bonus gauge 334*b* are at the threshold level, the visual effect 34, which illustrate explosions on the first reel 311 and first Wild gauge 331*a* and the fourth reel 314 and fourth Bonus gauge 334*b*, are shown.

After the visual effect 34 is shown, in the reel 31 whose corresponding Bonus gauge 33*b* reaches the threshold, the Bonus symbol 323 changes into a Treasure symbol 324 and a certain amount of bonus credit is paid to the player. Likewise, an Entire Reel Wild Symbol 322 appears in the reel 31 whose corresponding Wild gauge 33*a* reaches the threshold. From FIGS. 17 to 18, the Bonus symbol 323 in the fourth reel 314 turns to the Treasure symbol 324 and the Wild symbol 322 in the first reel 311 changes to the Entire Reel Wild symbol 322.

Like this Example, the game design having plural types of gauges per reel and plural kinds of specific types of symbols brings the player various kinds of joy. Thus the gaming machine 1 in this Example provides more joyful games to the player. In the game status such as in FIG. 18, two gauges are at the threshold and three gauges are close to the threshold. The player is obtaining the rewards from the first Wild gauge 331*a* and the fourth Bonus gauge 334*b*. Furthermore, the player would expect to acquire the rewards from the third Wild gauge 333*a*, fourth Wild gauge 334*a* and the second Bonus gauge 332*b* soon. Such a situation will excite the player.

§6.2. OPERATION OF EXAMPLE 5

Figure 19:
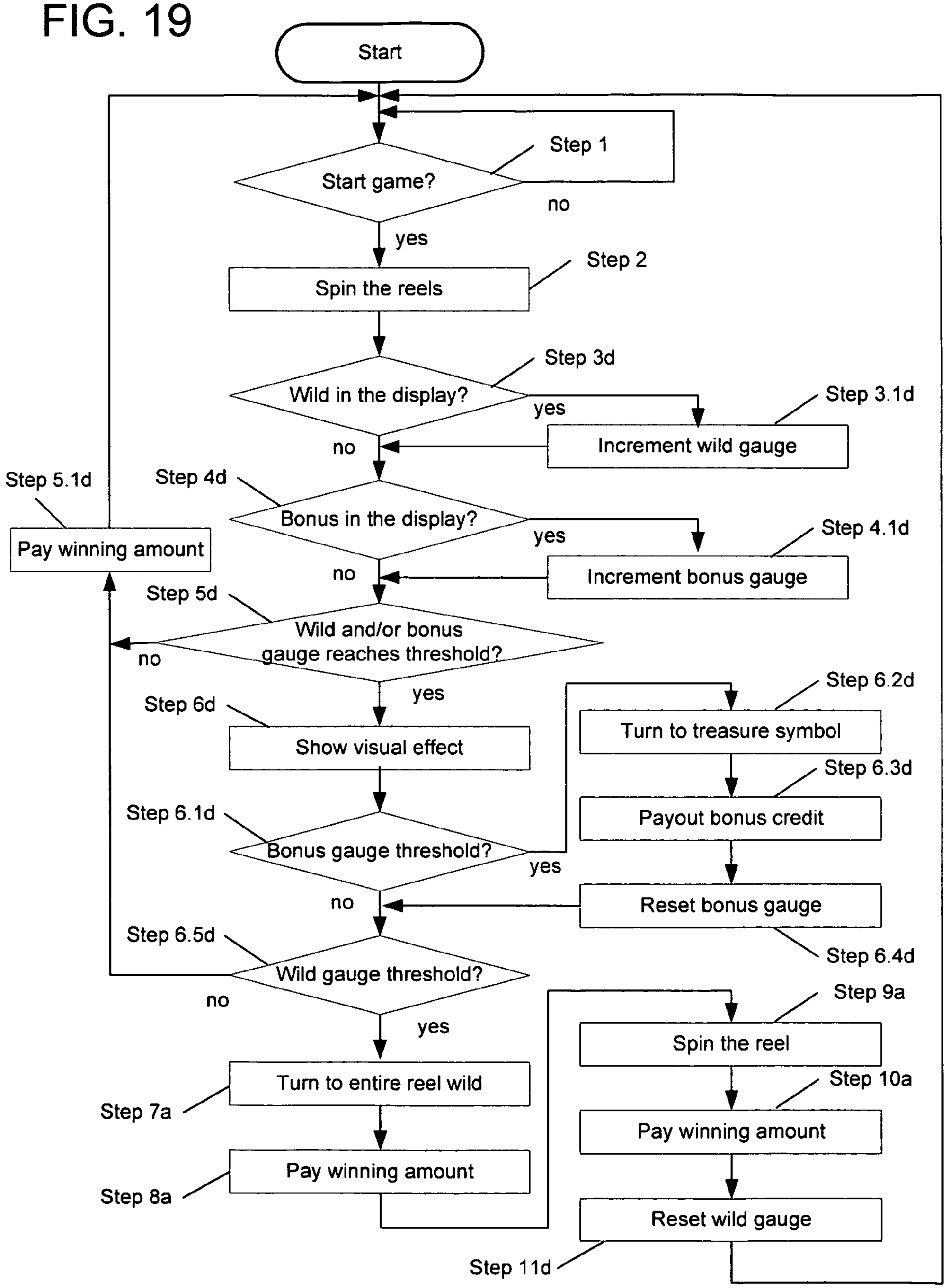
FIG. 19 is a flowchart describing an operation of Example 5 of the present invention.

Below, only the operations that are different from those in the Examples 1 and 2 are described, using FIG. 19.

<Steps 1 & 2> The gaming machine 1 starts a game and spins the reels 31.

<Step 3d> After the reels 31 stop, the gaming machine 1 judges whether the Wild symbol 321 is in the display 3 reel by reel. If there is no Wild symbol 321, the operation jumps to Step 4d. If there is a Wild symbol 321 in the display 3, the operation proceeds to Step 3.1d.

<Step 3.1d> The gaming machine 1 increments the value in the counter 221 that corresponds to the reel 31 where the Wild symbol 321 shows up. Also, the gaming machine 1 reflects the values stored in the counter 221 to the values of the Wild gauges 33*a* based on each reel 31 as shown in FIG. 16.

<Step 4d> The gaming machine 1 judges whether the Bonus symbol 323 is in the display 3 reel by reel. If there is no Bonus symbol 323, the operation jumps to Step 5d. If there is a Bonus symbol 323 in the display 3, the operation proceeds to Step 4.1d.

<Step 4.1d> The gaming machine 1 increments the value in the counter 221 that corresponds to the reel 31 where the Bonus symbol 323 shows up. Also, the gaming machine 1 reflects the values stored in the counter 221 to the values of the Bonus gauges 33*b* based on each reel 31 as shown in FIG. 16.

<Step 5d> The gaming machine 1 judges whether the Wild gauge 33*a* and/or Bonus gauge 33*b* have reached the threshold like Step 5 in Example 1. If the value is below the threshold, the operation branches to Step 5.1d. If the value in the counter 221 is the same or above the threshold, the operation proceeds to Step 6d.

<Step 5.1d> The gaming machine 1 calculates and returns a winning amount of credit like Step 3.1 in Example 1. Then, the operation goes back to Step 1.

<Step 6d> The gaming machine 1 shows the visual effect 34 like FIG. 17.

<Step 6.1d> The gaming machine 1 judges whether the value in the counter 221 corresponding to the Bonus gauge 33*b* is the same as or above the threshold like Step 5 in Example 2. If the value is below the threshold, the operation moves to Step 6.5d. If the value in the counter 221 is the same or above the threshold, the operation proceeds to Step 6.2d.

Figure 18:
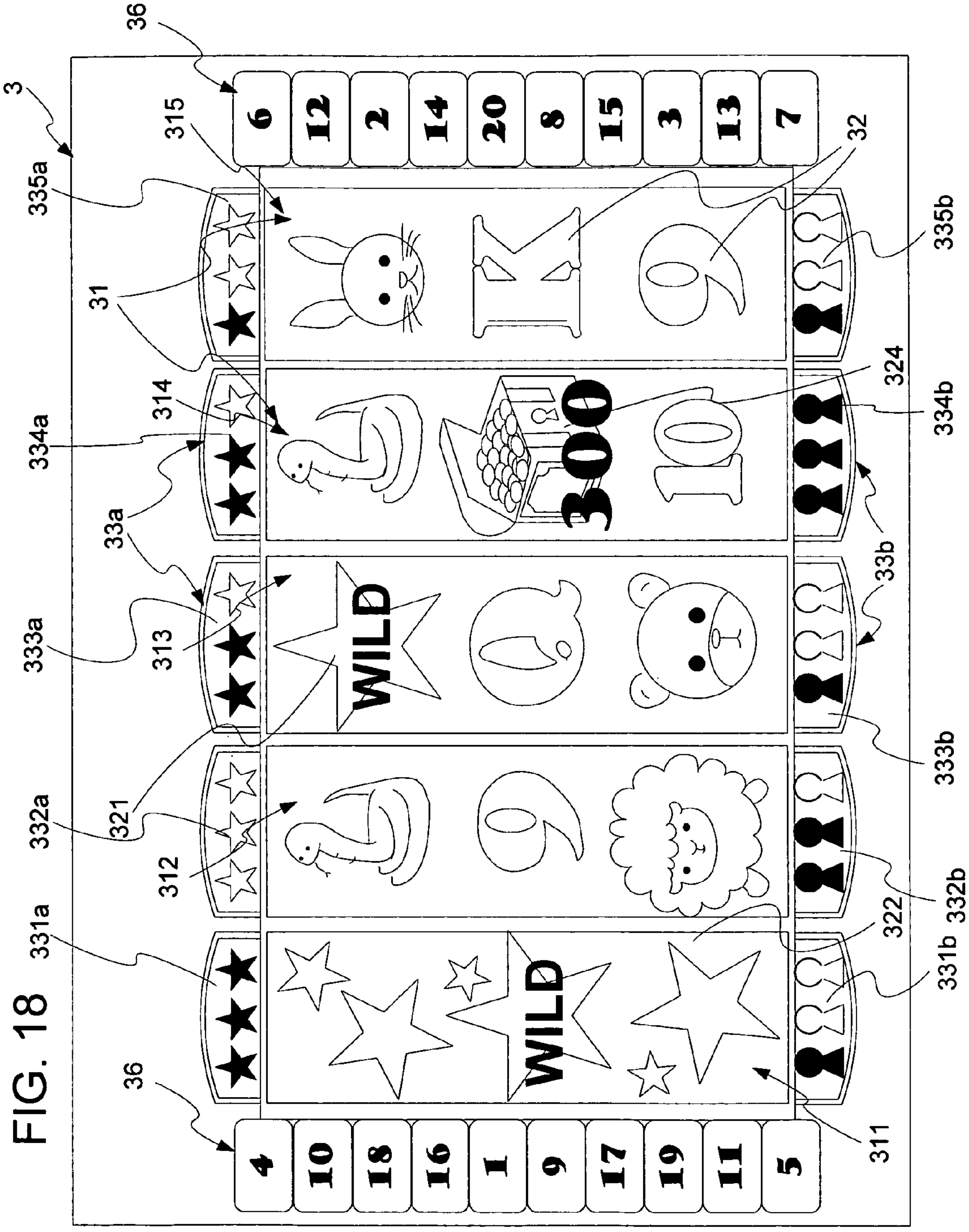
FIG. 18 is a display image to explain Example 5 of the present invention.

<Step 6.2d> The gaming machine 1 changes the Bonus symbol 323 into the Treasure symbol 324 as show in FIG. 18.

<Step 6.3d> The gaming machine 1 calculates the amount of bonus credit and rewards the bonus credit to the player.

<Step 6.4d> The gaming machine 1 resets the value in the counter 221 and the Bonus gauge 33*b* as described at Step 11 in Example 2.

<Step 6.5d> The gaming machine 1 judges whether the value in the counter 221 corresponding to the Wild gauge 33*a* is the same or above the threshold like Step 5 in Example 1. If the value is below the threshold, the operation goes back to Step 1. If the value in the counter 221 is the same or above the threshold, the operation proceeds to Step 7a.

<Steps 7a-10a>Same as Steps 7a-10a in Example 1.

<Step 11d> The gaming machine 1 resets the value in the counter 221 and the Wild gauge 33*a* as described in Example 1. Then, the operation goes back to Step 1.

§7. Example 6

Figure 20:
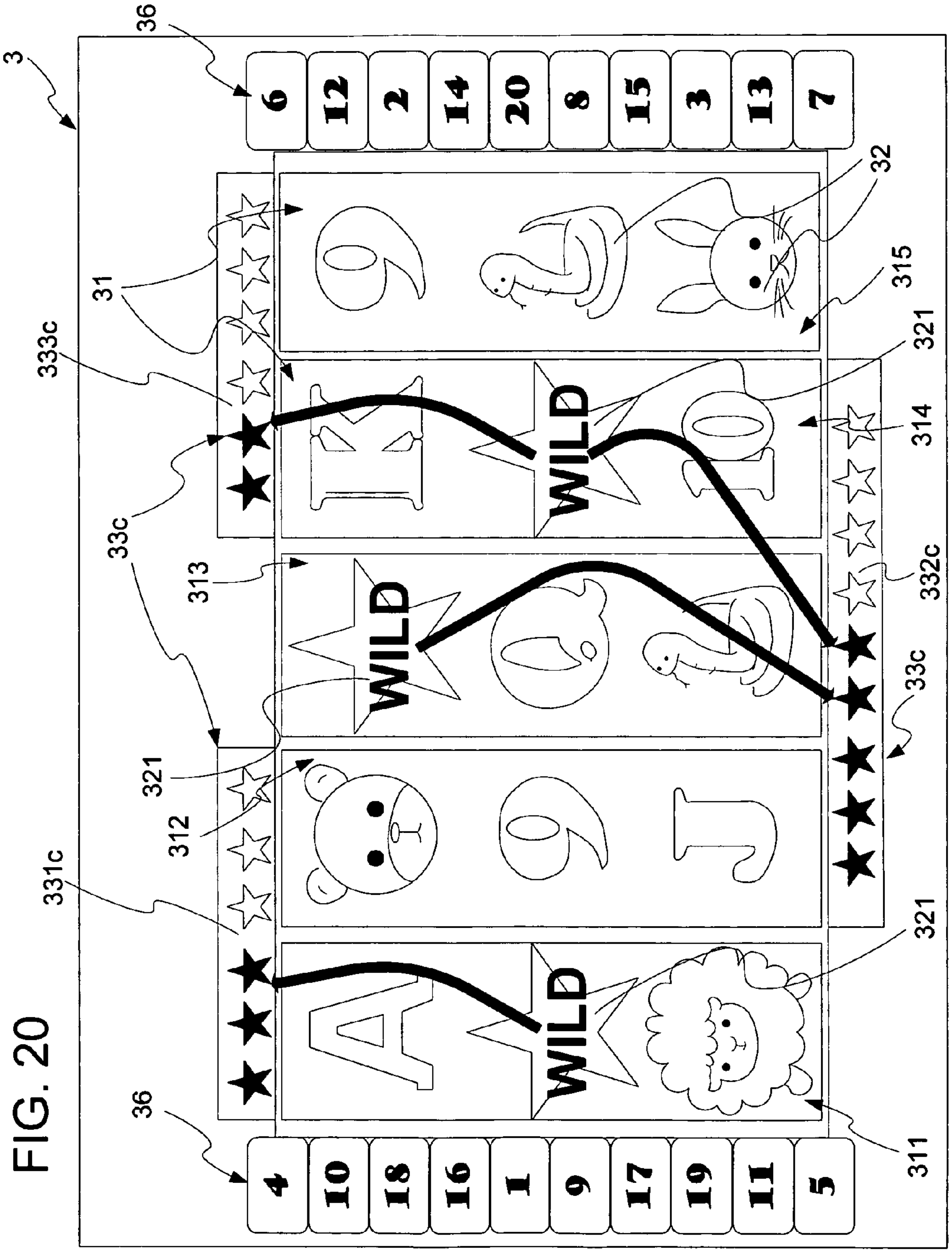
FIG. 20 is a display image to explain Example 6 of the present invention.

As shown in FIG. 20, in this Example, each of the gauges 33*c* is provided to cover more than one of the reels 31. More exactly speaking, one of the gauges 33*c* corresponds to more than one of the reels 31. Also, some of the reels 31 correspond to more than one of the gauges 33*c*. In FIG. 20, the gauges 33*c* are made up with the first gauge 331*c*, the second gauge 332*c* and the third gauge 333*c* from left to right. The first gauge 331*c* covers and corresponds to the first reel 311 and the second reel 312. The second gauge 332*c* covers and corresponds to the second reel 312, the third reel 313 and the fourth reel 314. The third gauge 333*c* covers and corresponds to the fourth reel 314 and the fifth reel 315.

When the Wild symbol 321 shows up in the first reel 311, the value of the first gauge 331*c* is incremented. When the Wild symbol 321 shows up in the second reel 312, the values of the first gauge 331*c* and the second gauge 332*c* are incremented. When the Wild symbol 321 shows up in the third reel 313, the value of the second gauge 332*c* is incremented. When the Wild symbol 321 shows up in the fourth reel 314, the values of the second gauge 332*c* and the third gauge 333*c* are incremented. When the Wild symbol 321 shows up in the fifth reel 315, the value of the third gauge 333*c* is incremented.

As a result, the value of each gauge 33*c* is arranged to reflect the total number of how many times the Wild symbol 321 appears in the corresponding reels 31. Therefore, the first gauge 331*c* reflects the total number of how many times the Wild symbol 321 appears in the first reel 311 and the second reel 312. The second gauge 332*c* reflects the total number of how many times the Wild symbol 321 appears in the second reel 312, third reel 313 and fourth reel 314. Lastly, the third gauge 333*c* reflects the total number of how many times the Wild symbol 321 appears in the fourth reel 314 and fifth reel 315.

Figure 21:
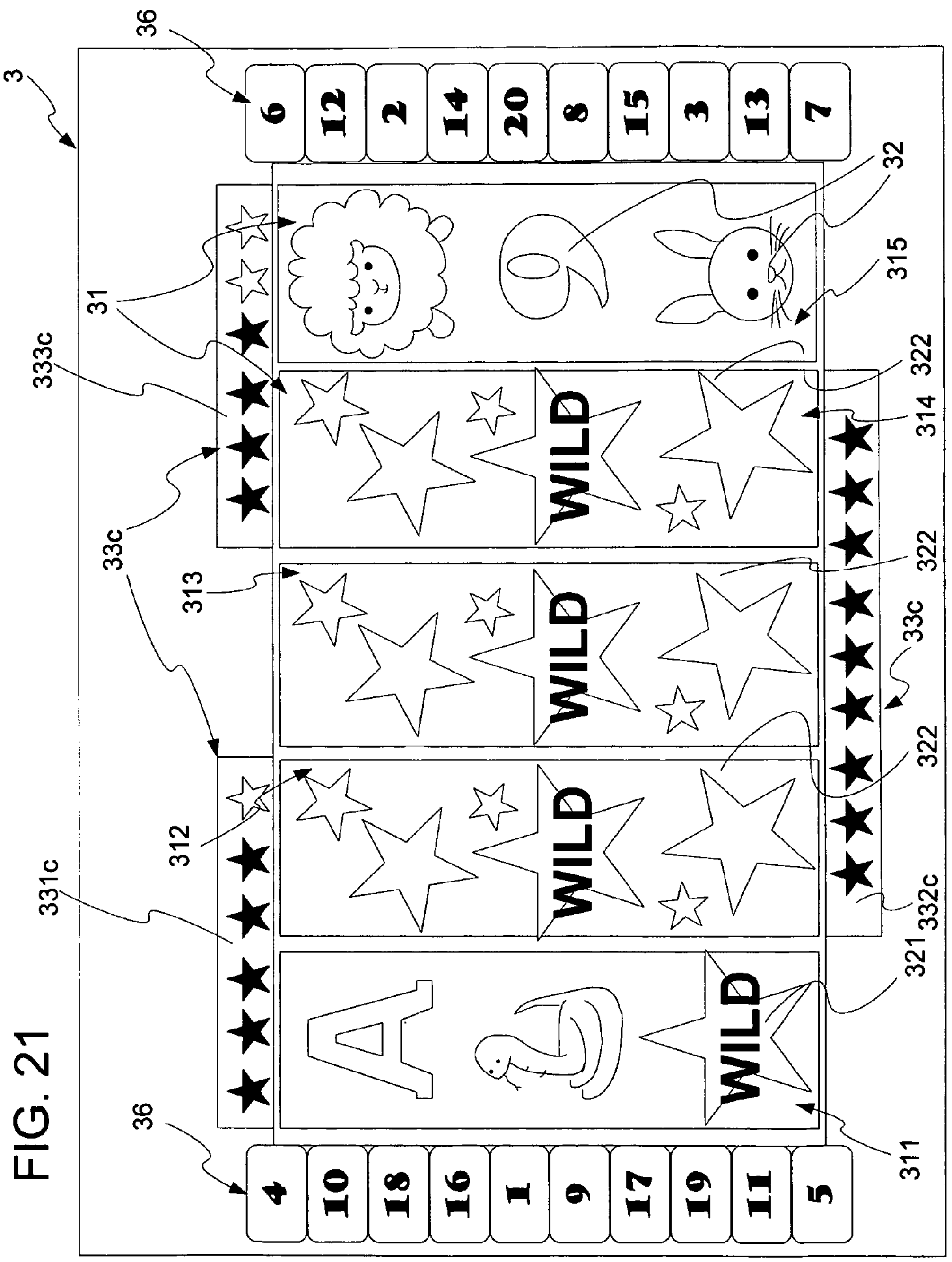
FIG. 21 is a display image to explain Example 6 of the present invention.

As shown in FIG. 21, once the value of the gauge 33*c* reaches the threshold, all the corresponding reels 31 initiate the feature, which is an appearance of the Entire Reel Wild symbols 322. In FIG. 21, since the value of the second gauge 332*c* has reached the threshold, the Entire Reel Wild Symbols 322 show up in the second reel 312, third reel 313, and fourth reel 314.

In this Example, the features are brought up to plural reels 31 at the same time. Such a situation gives the player an exciting opportunity to acquire a big award.

Since the operation of the gaming machine 1 in this Example is substantially the same as that in Example 1, the explanation of the operation in this Example is skipped.

§8. EXAMPLE 7

In this section, Example 7 is explained, using FIGS. 22-26. Below, only the things that are different from the things in Example 1 are explained and the same explanations are omitted.

§8.1. DESIGN OF EXAMPLE 7

In this Example, the gaming machine 1 does not initiate a feature but is arranged to initiate a feature when the value of the gauge 33*d* reaches the threshold. This means the gaming machine 1 becomes ready to initiate the feature when the value of the gauge 33*d* is the same or above the threshold.

Figure 22:
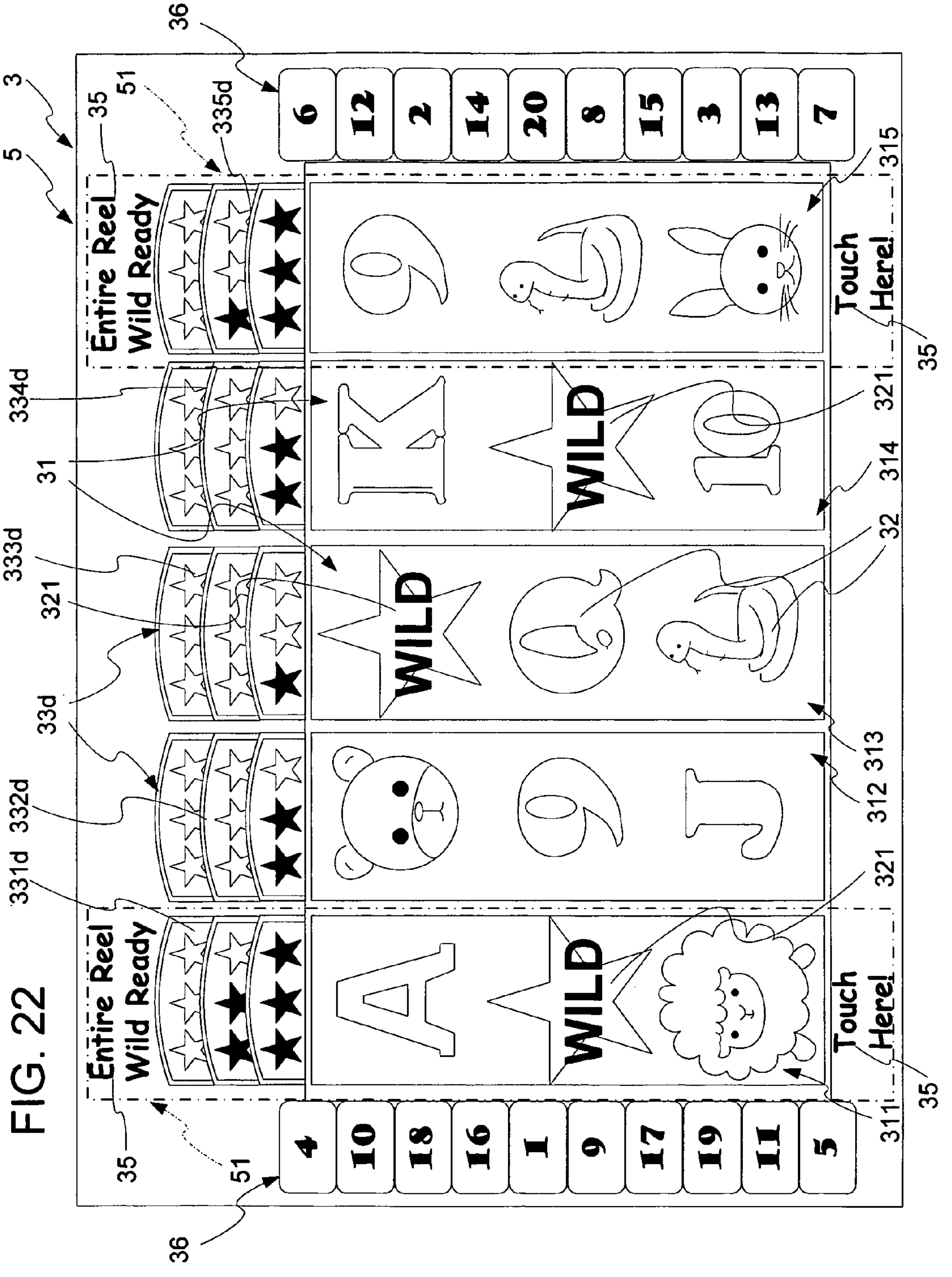
FIG. 22 is a display image to explain Example 7 of the present invention.

As shown in FIG. 22, when the value of the gauge 33*d* reaches the threshold, the gaming machine 1 shows a message 35 that indicates the feature is available to start. In FIG. 22, the message 35 is shown above the first gauge 331*d* and the fifth gauge 335*d* and below the first reel 311 and the fifth reel 315 because the values of the first gauge 331*d* and the fifth gauge 335*d* are above the threshold. The messages 35 say "Entire Reel Wild Ready" and "Touch Here!" In FIG. 22, the threshold value of the gauges 33*d* is 'three' while the maximum value of the gauges 33*d* is 'nine'.

As described before, in the gaming machine 1, the touch panel 5 is overlaid on the display 3. Once the player touches the area 51 in the touch panel 5, which covers the reel 31, gauge 33*d* and message 35 whose corresponding value is the same or over the threshold value, the feature is initiated.

Figure 23:
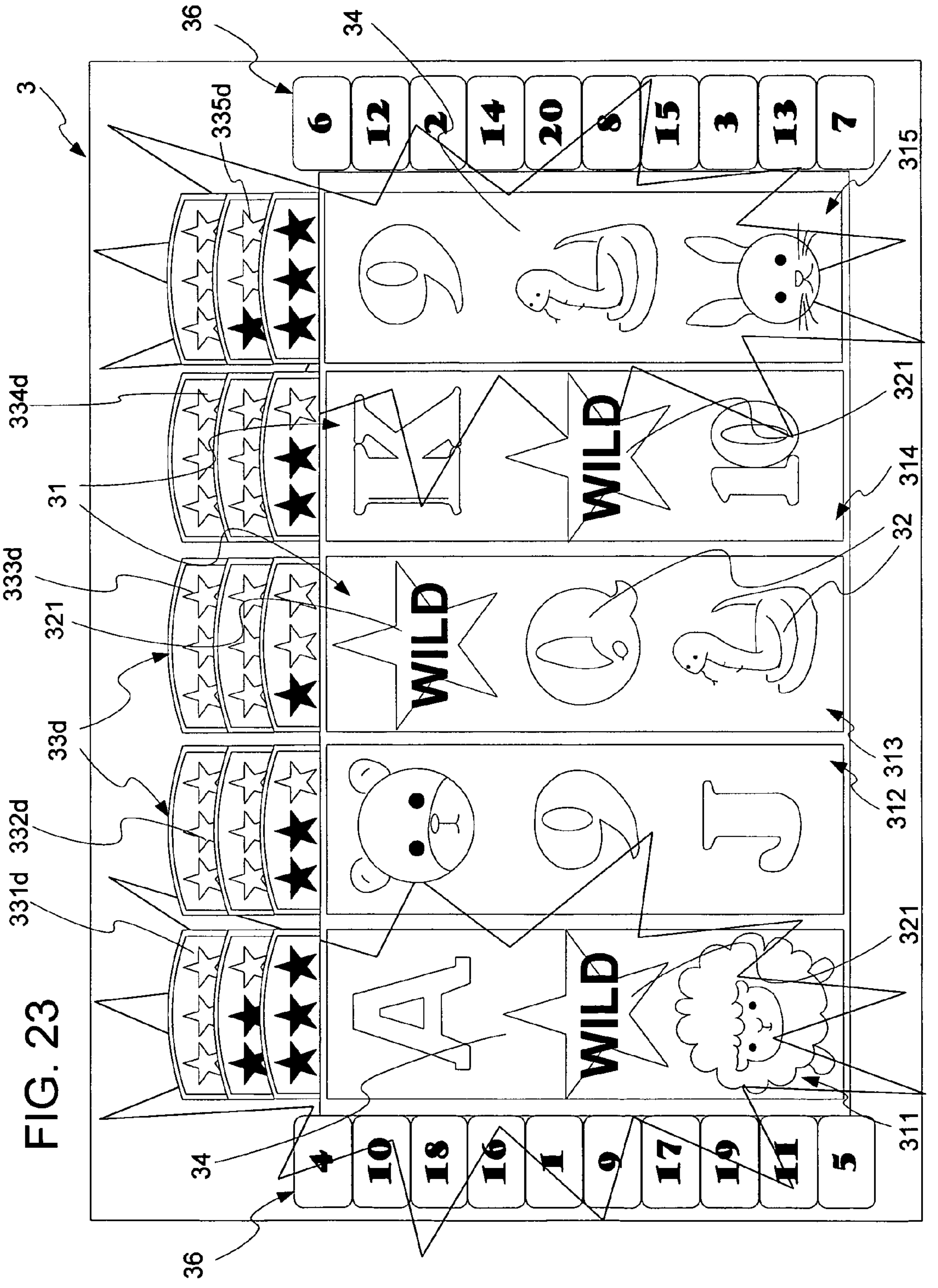
FIG. 23 is a display image to explain Example 7 of the present invention.

Touching the areas 51 on the first reel 311 and the fifth reel 315 brings the visual effects 34 on the first reel 311 and the first gauge 331*d* and the fifth reel 315 and the fifth gauge 335*d* as shown in FIG. 23.

Figure 24:
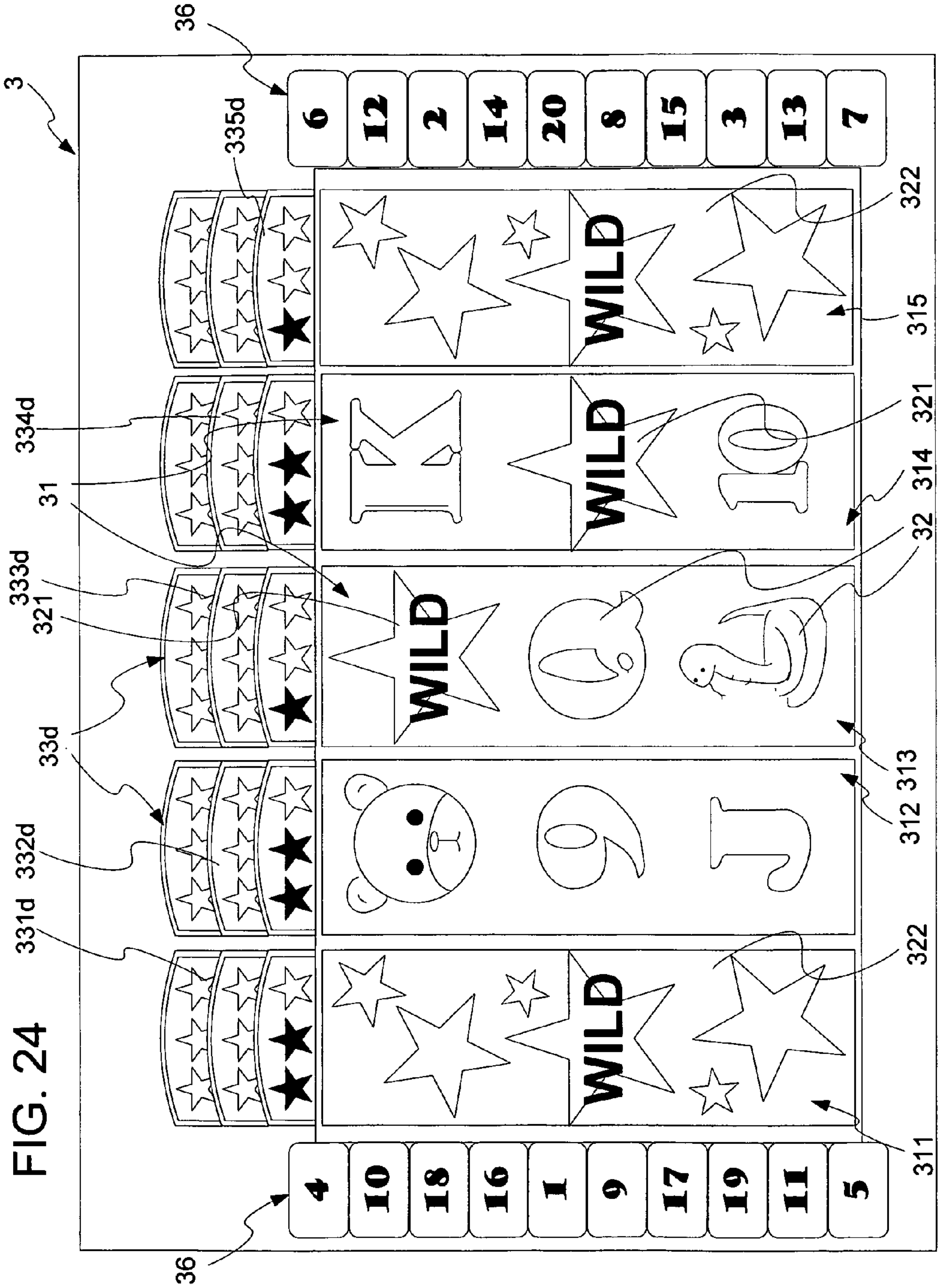
FIG. 24 is a display image to explain Example 7 of the present invention.
Figure 25:
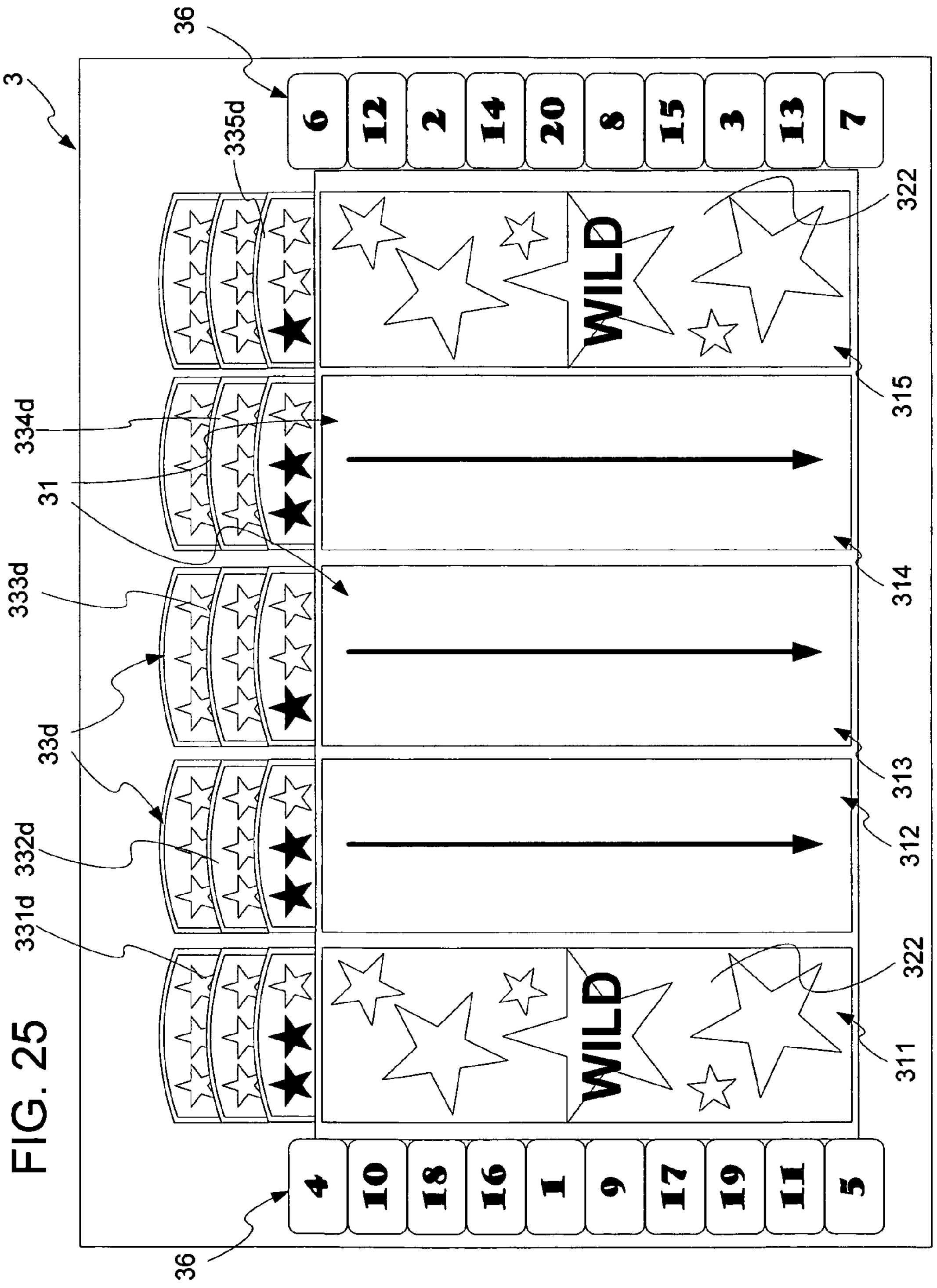
FIG. 25 is a display image to explain Example 7 of the present invention.

Subsequently, as shown in FIG. 24, the Entire Reel Wild symbols 322 shows up on the first reel 311 and fifth reel 315 as a feature. Also, the value 'three' is subtracted from the values in the first gauge 331*d* and fifth gauge 335*d*. This value is same as the value of the threshold of the gauge 33*d*. Then, as shown in FIG. 25, the second gauge 332*d*, third gauge 333*d* and fourth gauge 334*d*, which are not the subject of the feature, begin to spin without accepting a bet of credit from the player.

In this Example, the player can choose when the feature is initiated after the feature becomes ready to start. This makes the game tactical. In the game status shown in FIG. 25, the player may expect to obtain a big award. Such expectation can be brought by a wise judgment of the player. Hence, the player can enjoy the games, thinking about tactics.

Furthermore, the gaming machine 1 provides a notification to the player when the feature is ready to come out. Such a notification makes it easy for the player to understand the choices offered and helps him/her to carry out the tactical play.

§8.2. OPERATION OF EXAMPLE 7

Figure 26:
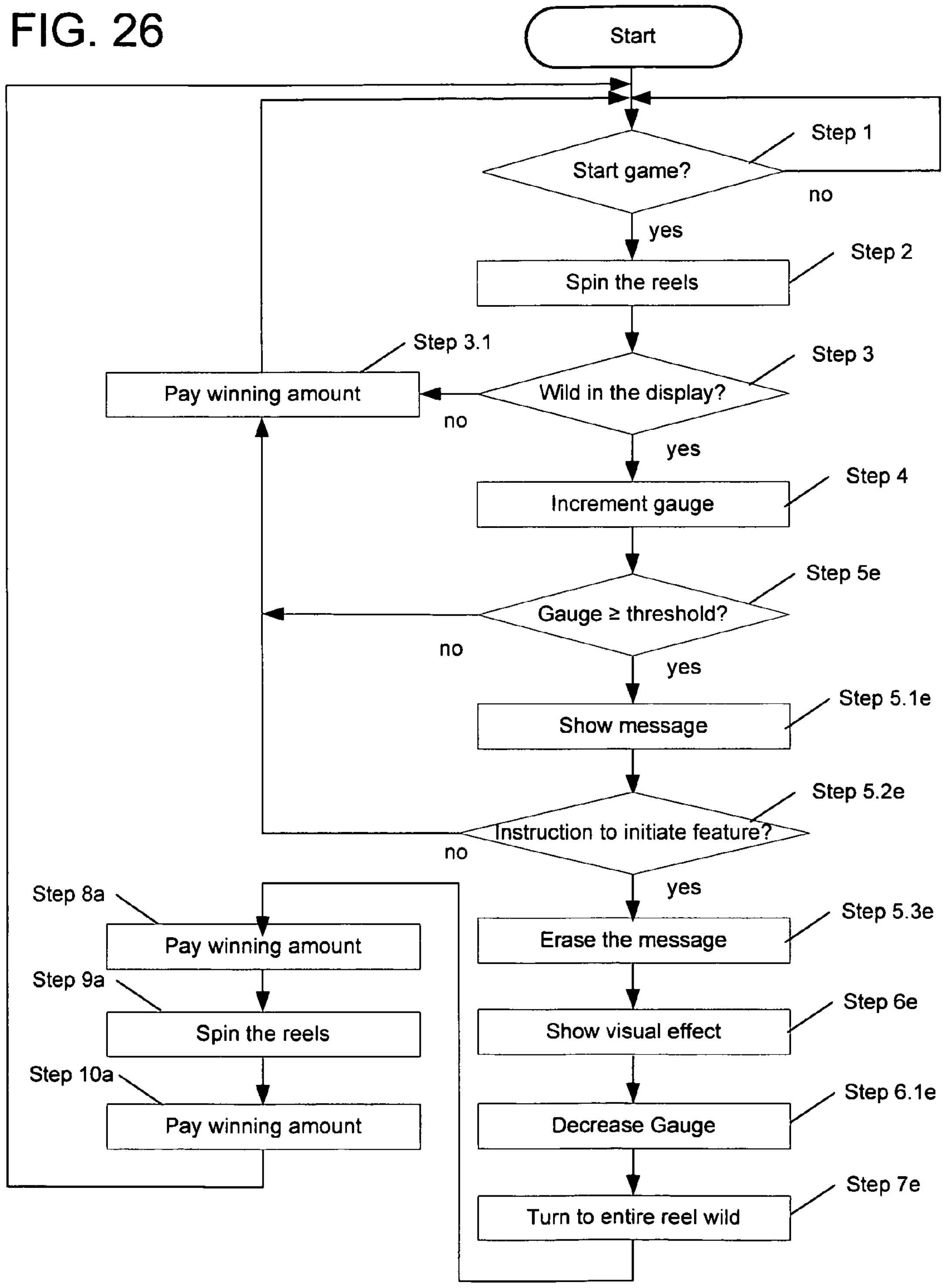
FIG. 26 is a flowchart describing an operation of Example 7 of the present invention.

Below, only the operations that are different from those in Example 1 are described, using FIG. 26.

<Steps 1-4> Same as Steps 1-4 in Example 1.

<Step 5e> The gaming machine 1 judges whether the gauge 33*d* is the same as, or above, the threshold like Step 5 in Example 1. If the value is below the threshold, the operation moves to Step 3.1. If the value in the counter 221 is the same or above the threshold like FIG. 22, the operation proceeds to Step 5.1e.

<Step 5.1e>The gaming machine 1 shows the message 35 near the reel 31 whose corresponding gauge's value is the same or above the threshold.

<Step 5.2e> The gaming machine 1 judges whether the area 51 has been touched by the player. In other words, the gaming machine 1 judges whether it has received an instruction to initiate the feature. When the gaming machine 1 has received the instruction, the operation proceeds to Step 5.3e. Otherwise, the operation moves to Step 3.1.

<Step 5.3e> The gaming machine 1 erases the message 35.

<Step 6e>The gaming machine 1 shows the visual effect 34 like FIG. 23.

<Step 6.1e> The gaming machine 1 subtracts a certain value in the counter 221 and the gauge 33*d* whose corresponding reel 31 was instructed to initiate the feature. Thus, from FIGS. 23 to 24, the value of the first gauge 331*d* is set down to 'two' and the value of the fifth gauge 335*d* is set down to 'one'.

<Step 7e> The gaming machine 1 changes the symbols 32, whose corresponding reel 31 was instructed to initiate the feature, into the Entire Reel Wild symbol 322. Thus, in FIG. 24, the Entire Reel Wild symbols 322 show up in the first reel 311 and the fifth reel 315.

<Steps 8a-10a> Same as Steps 8a-10a in Example 1. In the end, the operation goes back to Step 1.

§9. Miscellaneous Remarks

Until the previous section, the present invention was described based on the specific Examples. However, this invention is not limited to the above Examples. Below are a few examples of various modifications that are still within the range of this invention.

In the above Examples, the specific types of symbols were the Wild symbol 321 or the bonus symbol 323. However, the specific types of symbols are not limited to these kinds of symbols. For example, it is OK even if the specific types of symbols are multiplier symbols or trigger symbols that can trigger a secondary game.

In the above Examples, the visual effect 34 was shown when the gauge 33 reached a threshold. Such visual effects entertain the player. However, the visual effect 34 is not essential and it is OK even not to show a visual effect when the gauge 33 reaches a threshold or before initiating the feature.

In some of the above Examples, the gaming machine 1 turned the Wild symbol 321 into the Entire Reel Wild symbol 322. This is just an example of the process of increasing a winning chance. The process that enhances the winning chance can take other forms. For example, it is OK that the gaming machine 1 doubles the number of Wild symbols 321 in the display 3 as a way to elevate the winning probability. Overall, the enhancement of a winning probability makes the gaming machine 1 more amusing.

In some of the above Examples, one feature was the change of the Wild Symbol 321 or Bonus symbol 323 (one type of symbol) into the Entire Reel Wild Symbol 322 or Treasure symbol 324 (another type of symbol). However, it is OK that one type of symbol changes to another type of symbol other than the Entire Reel Wild Symbol 322 and Treasure symbol 324 such as a multiplier symbol, a bonus game symbol or a wild symbol that contains a multiplier (e.g. W×3).

In the above Examples, one feature was the appearance of the Entire Reel Wild symbol 322 or the payout of the bonus credit. However, the features are not limited to these events. For example, it is OK even if the feature is an elevation of a multiplier value or an initiation of a secondary game.

In the above Examples, the value of the gauge 33 and the counter 221 was incremented when the specific type of symbol showed up in the display 3. In other words, a value 'one' was added to the value of the gauge 33 and the counter 221. However, it is OK to add more than 'one' value to the value of the gauge 33 and the counter 221.

In the above Example, the value of the gauge 33 was represented by the number of 'black star marks'. However, it is OK to indicate the value of the gauge 33 by a graph, numerals or any other way.

In some of the above Examples, the gaming machine 1 provided a free spin after the Entire Reel Wild symbol 322 appeared. However, it is OK if the gaming machine 1 does not provide the free spin.

In some of the above Examples, after the feature, the gaming machine 1 reset the value of the gauge 33*a* and the value of the counter 221 in the memory 22 that reached the threshold. However, it is OK for the gaming machine 1 to not reset the value of the counter 221 or the value in the gauge 33*a*. For example, the gaming machine 1 can just subtract a certain value from the value in the counter 221.

In the above Examples, the gaming machine 1 had five reels and three symbols per reel. However, the organizations of the reels and symbols are not limited to the above Examples. For example, it is OK to have three reels or five symbols per reel.

In the above Examples, the controller 2 is designed to control the gaming machine 1 by the mechanism that the internal CPU 21 runs the programs stored in the memory 22. However, the architecture of the controller 2 is not limited to this organization. For example, it is OK even if the controller 2 doesn't have a CPU 21 nor memory 22. It is OK even if the controller is made of other types of electrical devices, mechanical devices or a combination of them.

The present invention was explained based on the Examples of a standard video slot. However, this invention is also applicable to other types of video slots such as hexagon type, scatter reel type and other types of video slot machines.

In the end, the present invention was explained based on the video slot Examples. However, this invention is also applicable to slot machines, pachisuro and any other gaming machines.

What is claimed is:

1. A gaming machine comprising:

a display, which shows groups of symbols that contain at least a specific type of symbol, the symbols being aligned along a plurality of reels;

a controller, which controls movement of the symbols in the display;

a counter, which counts a number of times that the specific type of symbol appears in each of the plurality of reels in the display;

a plurality of gauges, each of which reflects the number counted by the counter, with each gauge being provided corresponding to each reel; and a memory, which memorizes the number counted by the counter corresponding to the reel;

wherein when the number in the memory reaches a threshold,, the controller causes the gaming machine to enter a state where a feature of the reel that is associated with the number in the memory that reached the threshold is ready to be initiated, and maintains the state until an instruction to initiate the feature is inputted to the gaming machine so that the feature of the reel being favorable to a player of the gaming machine can be selectively initiated at a favorable timing.

2. The gaming machine according to claim 1, wherein all the symbols in the reel turn to wild symbols when the instruction to initiate the feature has been input to the gaming machine.

3. The gaming machine according to claim 1, wherein the specific type of symbol is a wild symbol.

4. The gaming machine according to claim 1, wherein a total number of the gauge is the same as a total number of the plurality of reels.

5. The gaming machine according to claim 1, further comprising: a plurality of gauges for one reel; and wherein the groups of symbols contain a plurality of different kinds of specific types of symbols;

wherein each of the specific types of symbols corresponds to each of the plurality of gauges.

6. The gaming machine according to claim 1, wherein each gauge is arranged to reflect a total number counted over each of the plurality of reels.

7. The gaming machine according to claim 1, wherein the threshold is lowered when the controller receives an input of an extra bet.

8. A gaming machine comprising:

a display that shows a plurality of reels, each of the plurality of reels containing a plurality of symbols;

a controller that controls a movement of each of the symbols, and the controller counts a number of times that a specific type of symbol appears in each reel in the display; and a plurality of gauges, with each of the plurality of gauges reflecting a value of the number counted by the controller;

wherein the controller is arranged to cause the gaming machine to enter a status where the controller is ready to initiate a feature on the reel whose gauge's value reaches a threshold when at least one of the number counted by the controller has reached the threshold, and maintains the status until an instruction to initiate the feature on the reel is inputted to the gaming machine so that the feature of the reel favorable to a player of the gaming machine is selectively activated at a favorable timing.

9. The gaming machine according to claim 8, wherein the display shows an availability to initiate the feature on the reel whose gauge's value reaches the threshold.

10. The gaming machine according to claim 8, wherein the feature is initiated when the controller receives the instruction to initiate the feature.

11. The gaming machine according to claim 8, wherein the feature is a change of at least one type of symbol into another type of symbol.

12. The gaming machine according to claim 11, wherein the another type of symbol is a symbol that functions as a wild symbol in all rows in the reel.

13. The gaming machine according to claim 11, wherein the another type of symbol is a bonus symbol.

14. A gaming machine comprising:

a plurality of reels, along which symbols are aligned;

a display, which shows the reels and symbols;

a controller, which controls movement of the reels and symbols; and a gauge for counting a number of times that a specific type of symbol appears in each reel in the plurality of reels, wherein the display includes at least one said gauge, which corresponds to at least one of the plurality of reels;

wherein when one type of symbol appears in the display, a certain value is added to the gauge corresponding to the reel where the one type of symbol appeared, and wherein the controller initiates a feature of the at least one of the plurality of reels when a count value of the at least one gauge has reached a threshold and an instruction for initiating a feature of the at least one of the plurality of reels is inputted to the gaming machine.

15. The gaming machine according to claim 14, wherein a total number of gauges is less than a total number of the reels.

16. The gaming machine according to claim 14, wherein a feature is initiated after the value of the gauge reaches a threshold.

17. The gaming machine according to claim 16, wherein the feature is an event that brings a benefit to a player of the gaming machine.

18. The gaming machine according to claim 16, wherein the feature is a change of all the symbols in the reel into wild symbols or a payout of a bonus credit.

19. The gaming machine according to claim 18, wherein the value of the gauge is reset to a default value after the feature is initiated.

* * * * *